US012731494B2

(12) United States Patent
Estes et al.

(10) Patent No.: US 12,731,494 B2
(45) **Date of Patent: *Sep. 8, 2026**

(54) DIGITAL COPILOT

(71) Applicant: The MITRE Corporation, McLean, VA (US)

(72) Inventors: Steven L. Estes, Savannah, GA (US); John R. Helleberg, Centreville, VA (US); Kevin M. Long, Ashburn, VA (US); Matthew E. Pollack, Falls Church, VA (US); Marco Quezada, Silver Spring, MD (US); Jeffrey Stein, Washington, DC (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,191

(22) Filed: Aug. 2, 2023

(65) Prior Publication Data

US 2024/0021088 A1 Jan. 18, 2024

Related U.S. Application Data

(63) Continuation of application No. 17/083,897, filed on Oct. 29, 2020, now Pat. No. 11,790,787, which is a (Continued)

(51) Int. Cl.

*G08G 5/21* (2025.01)
*G08G 5/26* (2025.01)

(Continued)

(52) U.S. Cl.

CPC ................. *G08G 5/21* (2025.01); *G08G 5/26* (2025.01); *G08G 5/30* (2025.01); *G08G 5/32* (2025.01);

(Continued)

(58) Field of Classification Search

CPC .... G08G 5/0021; G08G 5/0013; G08G 5/003; G08G 5/0034; G08G 5/0039; G08G 5/0065; G08G 5/0078; G08G 5/025

(Continued)

(56) References Cited

U.S. PATENT DOCUMENTS 4,413,322 A * 11/1983 Foster .................. G01S 5/0269 701/467
6,380,869 B1 4/2002 Simon et al.

(Continued)

FOREIGN PATENT DOCUMENTS

JP 2006221543 A * 8/2006

OTHER PUBLICATIONS

Allen, B. Danette et al., (Jun. 2015) "Who's got the bridge?—Towards Safe, Robust Autonomous Operations at NASA Langley's Autonomy Incubator," American Institute of Aeronautics and Astronautics; 8 pages.

(Continued)

*Primary Examiner* — Redhwan K Mawari
(74) *Attorney, Agent, or Firm* — Morrison & Foerster LLP

(57) ABSTRACT

The present disclosure is directed to providing pilots with timely information to allow for better decision making and improved safety during the piloting of a flight. The systems and methods described herein can employ a collection of algorithms that can take disparate information, process it, and synthesize it into meaningful information for a pilot, flight crew, other flight systems, and/or other algorithms to consume.

15 Claims, 20 Drawing Sheets

Related U.S. Application Data continuation of application No. 15/706,282, filed on Sep. 15, 2017, now Pat. No. 10,891,867.

(60) Provisional application No. 62/395,205, filed on Sep. 15, 2016.

(51) Int. Cl.
*G08G 5/30* (2025.01)
*G08G 5/32* (2025.01)
*G08G 5/34* (2025.01)
*G08G 5/52* (2025.01)
*G08G 5/54* (2025.01)
*G08G 5/55* (2025.01)
*G08G 5/72* (2025.01)

(52) U.S. Cl.
CPC ................. *G08G 5/34* (2025.01); *G08G 5/52* (2025.01); *G08G 5/54* (2025.01); *G08G 5/55* (2025.01); *G08G 5/723* (2025.01)

(58) Field of Classification Search
USPC ............................................................ 701/25
See application file for complete search history.

(56) References Cited

U.S. PATENT DOCUMENTS

| | | | | |
|---|---|---|---|---|
| 6,380,870 | B1 * | 4/2002 | Conner | G01C 5/005 340/963 |
| 6,493,450 | B1 | 12/2002 | Scheuer et al. | |
| 6,873,872 | B2 | 3/2005 | Gluckman et al. | |
| 6,950,037 | B1 * | 9/2005 | Clavier | G08G 5/0091 342/36 |
| 6,963,743 | B1 | 11/2005 | James | |
| 7,366,577 | B2 | 4/2008 | DiSanza et al. | |
| 7,907,721 | B1 | 3/2011 | Wurtz | |
| 8,199,956 | B2 | 6/2012 | Haartsen et al. | |
| 8,750,534 | B2 | 6/2014 | Yamkovoy et al. | |
| 8,944,822 | B2 | 2/2015 | Gelinske et al. | |
| 8,970,399 | B1 | 3/2015 | Zimmer et al. | |
| 10,321,221 | B1 | 6/2019 | Quezada | |
| 10,453,349 | B2 * | 10/2019 | Marques | G08G 5/21 |
| 2003/0026440 | A1 | 2/2003 | Lazzeroni et al. | |
| 2006/0022845 | A1 | 2/2006 | Fischer | |
| 2006/0046656 | A1 | 3/2006 | Yang | |
| 2006/0085164 | A1 * | 4/2006 | Leyton | G06Q 10/04 702/179 |
| 2007/0088467 | A1 | 4/2007 | H. Knotts | |
| 2007/0150124 | A1 | 6/2007 | Wipplinger et al. | |
| 2007/0168122 | A1 | 7/2007 | Aspen | |
| 2007/0200731 | A1 | 8/2007 | Winkler et al. | |
| 2007/0222643 | A1 | 9/2007 | Winkler | |
| 2007/0299611 | A1 | 12/2007 | Winkler et al. | |
| 2008/0215198 | A1 * | 9/2008 | Richards | G08G 5/55 701/408 |
| 2008/0234882 | A1 * | 9/2008 | Villaume | G08G 5/21 340/963 |
| 2010/0030400 | A1 * | 2/2010 | Komer | G08G 5/0021 704/251 |
| 2010/0161160 | A1 | 6/2010 | Wilson et al. | |
| 2010/0167664 | A1 * | 7/2010 | Szini | H04B 17/27 455/73 |
| 2010/0174425 | A1 * | 7/2010 | Dal Santo | G08G 5/80 701/4 |
| 2011/0124381 | A1 | 5/2011 | Wurtz | |
| 2012/0140933 | A1 | 6/2012 | Sherwood et al. | |
| 2012/0218127 | A1 * | 8/2012 | Kroen | G08G 5/0052 340/945 |
| 2013/0238170 | A1 * | 9/2013 | Klinger | G05D 1/104 701/25 |
| 2016/0093223 | A1 * | 3/2016 | Caudron | G08G 5/0021 701/3 |
| 2016/0351058 | A1 * | 12/2016 | Wischmeyer | G08G 5/0056 |
| 2017/0053539 | A1 * | 2/2017 | Feyereisen | G08G 5/025 |
| 2017/0243495 | A1 * | 8/2017 | Moravek | G08G 5/0091 |
| 2017/0323570 | A1 | 11/2017 | Myren et al. | |
| 2018/0107227 | A1 | 4/2018 | Sharma | |
| 2018/0322793 | A1 | 11/2018 | Huang et al. | |
| 2019/0122567 | A1 | 4/2019 | Evans | |
| 2019/0122569 | A1 | 4/2019 | Villele et al. | |
| 2019/0129450 | A1 | 5/2019 | Echols et al. | |
| 2019/0158597 | A1 | 5/2019 | Evans et al. | |
| 2019/0281680 | A1 | 9/2019 | Thorne | |

OTHER PUBLICATIONS

Anonymous (2000) "Mobile phones can interfere with aircraft equipment according to new tests," located at https://dialog.proquest.com/professional/printviewfile?accountid=142257, visited on Sep. 26, 2017; 3 pages.

Anonymous (2010) "New Bose[R] A20[TM] Aviation Headset," located at https://dialog.proquest. com/professional/printviewfile?accountid=142257, visited on Sep. 26, 2017; 3 pages.

Burian, Barbara K. et al. (Nov. 2007) "Alone at 41,000 Feet," Flight Safety Foundation, Aerosafetyworld, located at http://human-factors.arc.nasa.gov/ihs/flightcognition/Publications/asw_nov07_p30-34.pdf; 5 pages.

Estes et al., Office Action dated Mar. 20, 2020, directed to U.S. Appl. No. 15/706,282; 15 pages.

Estes et al., U.S. Office Action dated Aug. 12, 2022, directed to U.S. Appl. No. 17/083,897; 11 pages.

Estes et al., U.S. Office Action dated Aug. 8, 2019, directed to U.S. Appl. No. 15/706,282, 18 pages.

Estes et al., U.S. Office Action dated Jan. 28, 2019, directed to U.S. Appl. No. 15/706,282, 22 pages.

Estes et al., U.S. Office Action dated Mar. 24, 2023, directed to U.S. Appl. No. 17/083,897; 10 pages.

George, Fred, (Jun. 2007) "The Virtual Copilot and the VLJ," Business & Commercial Aviation, vol. 100, Issue 6; 7 pages.

Giangreco, Leigh, (Nov. 2015) "DARPA completes flight tests for subsystems on automated cockpit," Inside Defense, Inside the Air Force; 1 page.

Quezada, Marco, U.S. Office Action dated Jul. 31, 2018, directed to U.S. Appl. No. 15/978,818; 9 pages.

US Department of Transportation Federal Aviation Administration ( Oct. 2017) "Aeronautical Information Manual (AIM)," Official Guide to Basic Flight Information and ATC Procedures; 732 pages.

Wasserbly, Daniel (May 2016) "Xponential 2016: US Army eyes DARPA's cockpit automation project," located at http://www.janes.com/article/60028/xponential-2016-us-army-eyes-darpa-s-cockpit-automation-project?from_rss=1; 2 pages.

* cited by examiner

NOTIONAL DOWNWIND SCORING

| | RWY 02 | RWY 36 |
|---|---|---|
| Δ | 0.2 x 0.2 = .04 | 0.9 x 0.2 = .18 |
| atd | 0.8 x 0.2 = .16 | 0.6 x 0.2 = .16 (*LATE TURN*) |
| xtd | 0.5 x 0.2 = .10 | 0.9 x 0.2 = .18 |
| VSPEED | 0.8 x 0.2 = .16 | 0.8 x 0.2 = .16 |
| ALTITUDE | 0.7 x 0.2 = .14 | 0.8 x 0.2 = .16 |
| | .70 | (.84) RESULTS IN PATTERN DOWNWIND AND RUNWATY END 36 |

*SCORE x WEIGHT = RESULT*

Δ = *DELTA BETWEEN RUNWAY HEADING AND OWNSHIP TRACK*
*atd* = *ALONG TRACK DISTANCE*
*xtd* = *CROSS TRACK DISTANCE*

DIGITAL COPILOT

CROSS-REFERENCE TO RELATED APPLICATION

This application is a continuation of U.S. application Ser. No. 17/083,897, filed Oct. 29, 2020, which is a continuation of U.S. application Ser. No. 15/706,282, filed Sep. 15, 2017, which claims the benefit of U.S. Provisional Application No. 62/395,205, filed Sep. 15, 2016, the entire contents of each of which are incorporated herein by reference.

FIELD OF THE DISCLOSURE

This disclosure relates to systems and methods for consuming, aggregating, and generating flight operation data to assist pilot decision making. More particularly, this disclosure relates to systems and methods that provide pilots with timely information to allow for better decision making and improved safety during the piloting of a flight.

BACKGROUND OF THE DISCLOSURE

General aviation ("GA") is civil aviation operations other than scheduled air services and non-scheduled air transport operations for compensation or hire. Although commercial aviation has been touted as one of the safest ways to travel, general aviation flight does not enjoy a similar safety record. In addition, single-pilot general aviation operations are higher risk than dual-pilot general aviation operations. For example, the accident rate for turbine aircraft certified for single-pilot operations is 3.4 times higher than the rate for aircraft requiring two pilots and the fatal accident rate for single-pilot operations is 13 times higher than dual-pilot operations (Robert E. Breiling and Associates' 2010 Report).

SUMMARY OF THE DISCLOSURE

In a typical dual-pilot operation, the copilot who is not flying the aircraft can handle other tasks involved in flight such as looking up pertinent information, prompting actions for the pilot flying at the appropriate time, and cross checking the performance of the pilot flying among other tasks. A single-pilot flight does not have a copilot who can perform other tasks during flight. This is one of the factors that increases the risk of single-pilot operations compared to dual-pilot operations.

Applicants have discovered a framework (i.e., a Digital Copilot) that can help improve general aviation safety by reducing single-pilot workload and/or providing timely information to the pilot. In some embodiments, the systems and methods disclosed herein can bring some of the benefits of Crew Resource Management (CRM) to the single-pilot cockpit. For example, the Digital Copilot can offload some pilot workload related to searching for and/or retrieving information by automatically presenting relevant information to the pilot based on context. In some embodiments, the Digital Copilot can deliver relevant information to the pilot based on context by predicting phase of flight and/or the pilot's intentions. For example, the digital copilot can determine what phase of flight the aircraft is currently in, and when applicable, also the traffic pattern leg the aircraft is on.

Some embodiments include a method comprising determining a phase of flight for the aircraft and in response to determining the phase of flight for the aircraft, providing the aircraft with at least one notification based on the phase of flight for the aircraft. In any embodiment, the method can include receiving a destination airport for an aircraft and determining whether visibility at the destination airport is below a threshold visibility. In any embodiment, in response to determining that the visibility at the destination airport is below a threshold visibility, notifying the aircraft of the visibility at the destination airport. In any embodiment, the method can include determining whether ceiling at the destination airport is below a threshold ceiling. In any embodiment, in response to a determination that the ceiling at the destination airport is below the threshold ceiling, providing the aircraft with at least one notification in accordance with the phase of flight for the aircraft. In any embodiment, the phase of flight for the aircraft can include takeoff or landing. In any embodiment, the method can include determining remaining distance to runway end. In any embodiment, based on the determined phase of flight of the aircraft, providing at least one notification to the aircraft comprising the remaining distance to runway end. In any embodiment, the phase of flight for the aircraft can include arrival. In any embodiment, the method can include determining whether the aircraft distance to destination airport is less than a threshold distance, and in response to determining whether the aircraft distance to destination airport is less than a threshold distance, providing the aircraft with a notification containing the appropriate radio frequency for weather information (for example, an Automated Terminal Information Service (ATIS) frequency that can be a continuous broadcast of recorded noncontrol aeronautical information in busier airport areas.). In any embodiment, the method can include determining whether the aircraft distance to destination airport is less than a threshold distance; determining whether the tower at the destination airport is open or closed; in response to determining that the aircraft distance to destination airport is less than a threshold distance and that the tower at the destination airport is open, providing the aircraft with a tower frequency notification; and in response to determining that the aircraft distance to destination airport is less than a threshold distance and that the tower at the destination airport is closed, providing the aircraft with a Common Traffic Advisory Frequency (CTAF) frequency notification. The common traffic advisory frequency, or CTAF, is the name given to the radio frequency used for air-to-air communication at US, CA, and AU non-towered airports. Alternatively, if the airport has a control tower, then the frequency of the control tower itself can be provided rather than the CTAF frequency. In any embodiment, the method can include determining an approach airport for the aircraft; determining if the approach airport is the same as the destination airport; and in response to a determination that the approach airport is not the same as the destination airport for the aircraft, providing the aircraft with a wrong airport notification. In any embodiment, the method can include determining an approach runway for the aircraft, determining closed runways from Notice to Airmen (NOTAM) data, determining if the approach runway is closed, and in response to determining that the approach runway is closed, providing the aircraft with a closed runway notification. A notice to airmen, or NOTAM, is a notice filed with an aviation authority to alert pilots of potential hazards along a flight route or at a location that could affect the safety of the flight. In any embodiment, the phase of flight can include downwind. In any embodiment, the phase of flight can include short final. In any embodiment, at least one notification based on the phase of flight for the aircraft is a "before landing" checklist notification. In any embodiment, the visibility notification, the ceiling notification, and/or any other notification can be an aural, tactile, and/or visual notification. In any embodiment, the method can be at an electronic device. In any embodiment, the electronic device can include a touch-sensitive display. In any embodiment, the method can be incorporated into panel-mount system.

Some embodiments include an electronic device comprising one or more processors; memory; and one or more programs, wherein the one or more programs are stored in the memory and configured to be executed by the one or more processors, the one or more programs including instructions for any of the methods described in the above paragraph. Some embodiments include a nontransitory computer readable storage medium storing one or more programs, the one or more programs comprising instructions, which when executed by an electronic device, cause the device to perform any of the methods described in the above paragraph.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Additional advantages will be readily apparent to those skilled in the art from the following detailed description. The examples and descriptions herein are to be regarded as illustrative in nature and not restrictive.

BRIEF DESCRIPTION OF THE FIGURES

Exemplary embodiments are described with reference to the accompanying figures, in which.

DETAILED DESCRIPTION OF THE DISCLOSURE

Figure 1:
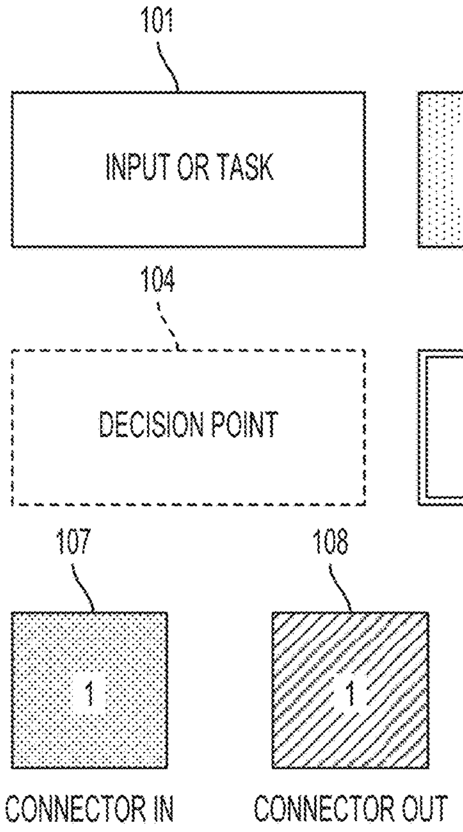
FIG. 1 illustrates a flowchart key for the various flowcharts disclosed herein.

Applicants have discovered a framework (i.e., a Digital Copilot) that can help improve general aviation safety by reducing single-pilot workload and/or providing timely information to the pilot. Specifically, the digital copilot can support the single pilot by performing some of the actions that a second pilot would typically perform. These actions can include, for example: simplifying information retrieval, offloading pilot information retrieval workload, providing contextually relevant information to the pilot, and/or cross checking pilot compliance with procedures and clearances. In some embodiments, the digital copilot can be an application for a computer.

The digital copilot herein seeks to provide pilots with timely information to allow for better decision making and improved safety during the piloting of a flight. Piloting an aircraft often requires a pilot or a flight crew to comprehend and reconcile disparate information quickly, and many times without much notice. This task can prove to be quite difficult and must be done in unison with the task of flying the aircraft. The digital copilot can employ a collection of algorithms that take the disparate information, process it, and synthesize it into meaningful information for the pilot, flight crew, other flight systems and/or other algorithms to consume. The system can maintain awareness of current and previous aircraft performance and can infer future aircraft performance states. The system can also infer pilot intent. With this information the system can adjust the inputs to algorithms, and the processing and synthesizing performed by the algorithms.

In some embodiments, the digital copilot can use flight context, thereby enabling the digital copilot to determine the pilot's intent and deliver relevant information to the pilot at the right time. The relevant information can be information elements that pilots need to access throughout the course of a typical flight. The digital copilot can automatically deliver the relevant information to the pilot through visual, tactile, and/or aural information as well as allowing the pilot to request or customize information delivered. In addition, the digital copilot can provide the pilot contextually relevant notifications. For example, the digital copilot can prompt the pilot to complete a checklist at the appropriate time, advise the pilot of deteriorating weather, or notify the pilot if they are on approach to a closed runway. These capabilities, and many others like them, can be made possible by algorithms that infer the current phase of flight, the current traffic pattern leg, and/or the destination airport (among others).

Besides single-pilot operations, many other operations may benefit from a digital copilot that never sleeps, does not get fatigued, and does not get distracted. For example, in the Asiana Airlines Flight 214 accident that occurred on Jul. 6, 2013, in San Francisco, California, the aircraft was trending low with low power and low airspeed. However, by the time the human pilots detected this trend, it was too late to recover. A digital copilot that had knowledge of the pilot's intent (i.e., to land at San Francisco) could have extrapolated the trend and potentially alerted the pilots to the impending situation with enough time to recover. Further, many Transport-Category aircraft have configuration alerts that will trigger if the pilot applies takeoff power and the aircraft is not configured for takeoff (e.g., flaps not set). A digital copilot could understand that a pilot taxiing from a gate toward a runway probably intends to takeoff and could then provide an earlier warning that the aircraft is not configured for takeoff.

In the following description of the disclosure and embodiments, reference is made to the accompanying drawings, in which are shown, by way of illustration, specific embodiments that can be practiced. It is to be understood that other embodiments and examples can be practiced, and changes can be made without departing from the scope of the disclosure.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," "obtaining," or the like, refer to the action and processes of a computer system, or similar electronic computing device, that manipulates and transforms data represented as physical (electronic) quantities within the computer system memories or registers or other such information storage, transmission, or display devices.

Certain aspects of the digital copilot include process steps and instructions described herein in the form of an algorithm. It should be noted that the process steps and instructions of the digital copilot could be embodied in software, firmware, or hardware and, when embodied in software, could be downloaded to reside on and be operated from different platforms used by a variety of operating systems.

The digital copilot also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the digital copilot is not described with reference to any particular programming language. It will be appreciated that a variety of programming languages may be used to implement the teachings of the digital copilot as described herein.

The digital copilot's methods and systems can be illustrated by flowcharts. The flowcharts can include a plurality of boxes. These boxes can correspond to various steps in a method or system. For example, some boxes may correspond to a processing step and other boxes may correspond to a decision step. FIG. 1 illustrates a flowchart key for the various flowcharts disclosed herein. As such, the flowchart key illustrated in FIG. 1 can be used for the algorithms/methods/systems illustrated in FIGS. 2, 4-10, and 12. As shown in FIG. 1, a solid-lined box 101 can indicate an input of a method and/or a task of a method. A filled-in box 102 can indicate an input that is dependent on another method or algorithm. A dot-dash box 103 can indicate a parallel/compound step of a method or algorithm. A dashed-box 104 can indicate a decision step of a method or algorithm. A double-lined box 105 can indicate a result of a method or algorithm. An arrow 106 can indicate the flow of the method or algorithm between one step to the next. For example, the arrow can indicate information/logic flow in a method or algorithm. A solid-one box 107 can indicate a connector in from one portion of a method or algorithm to another. A solid-fill-one box 108 can indicate a connector out from one portion of a method or algorithm to another. In addition, the algorithms disclosed in the figures can include various symbols. These symbols are described in the following table 1.

TABLE 1

| Symbol | Meaning |
|---|---|
| \|\| | OR |
| && | AND |
| = = or = | EQUALS |
| ! or != | NOT or NOT EQUALS |
| > | Greater than |
| < | Less than |
| <= | Less than or equal to |
| >= | Greater than or equal to |

The algorithms run by the digital copilot can be run by an algorithm manager. The algorithm manager can be responsible for managing the various algorithms.

Digital Copilot Controller

In some embodiments, the digital copilot can include a controller. The controller can register algorithms (e.g., one or more of the below algorithms) and can determine whether a notification should be presented to the pilot based on an algorithm result and stored data. Essentially, the controller can act as the brain of the digital copilot. For example, if the controller is unregistered for an algorithm or if the controller unregisters for an algorithm, the application or device for running the algorithm can be shut down to prevent unnecessary processing (presuming the algorithm is not in use elsewhere in the software). Similarly, registering for an algorithm may include activating an application or a device for running the algorithm, according to some embodiments. For example, the controller can register with the runway remaining algorithm during takeoff and landing so that it may deliver runway remaining notifications to the pilot based on those results. However, when airborne, the runway remaining algorithm may not be needed and, therefore, can be stopped. Besides the controller automatically registering and unregistering for an algorithm, a user can customize which information/notifications it wants to receive. Therefore, the controller can register and unregister for algorithms corresponding to the information/notifications.

In some embodiments, the controller registers or unregisters for application or device running the algorithm based on customizations or instructions input by the user. For example, the user can input a customization that specifies which algorithms are to be registered during certain phases of flight. In some embodiments, the controller can include speech recognition functionality to receive the user's instructions or customizations via speech commands. For example, the user can say "I don't want to know about weather conditions," which the controller can interpret via the speech recognition functionality. In response, the controller may deregister one or more algorithms related to monitoring and reporting weather conditions.

Figure 2A:
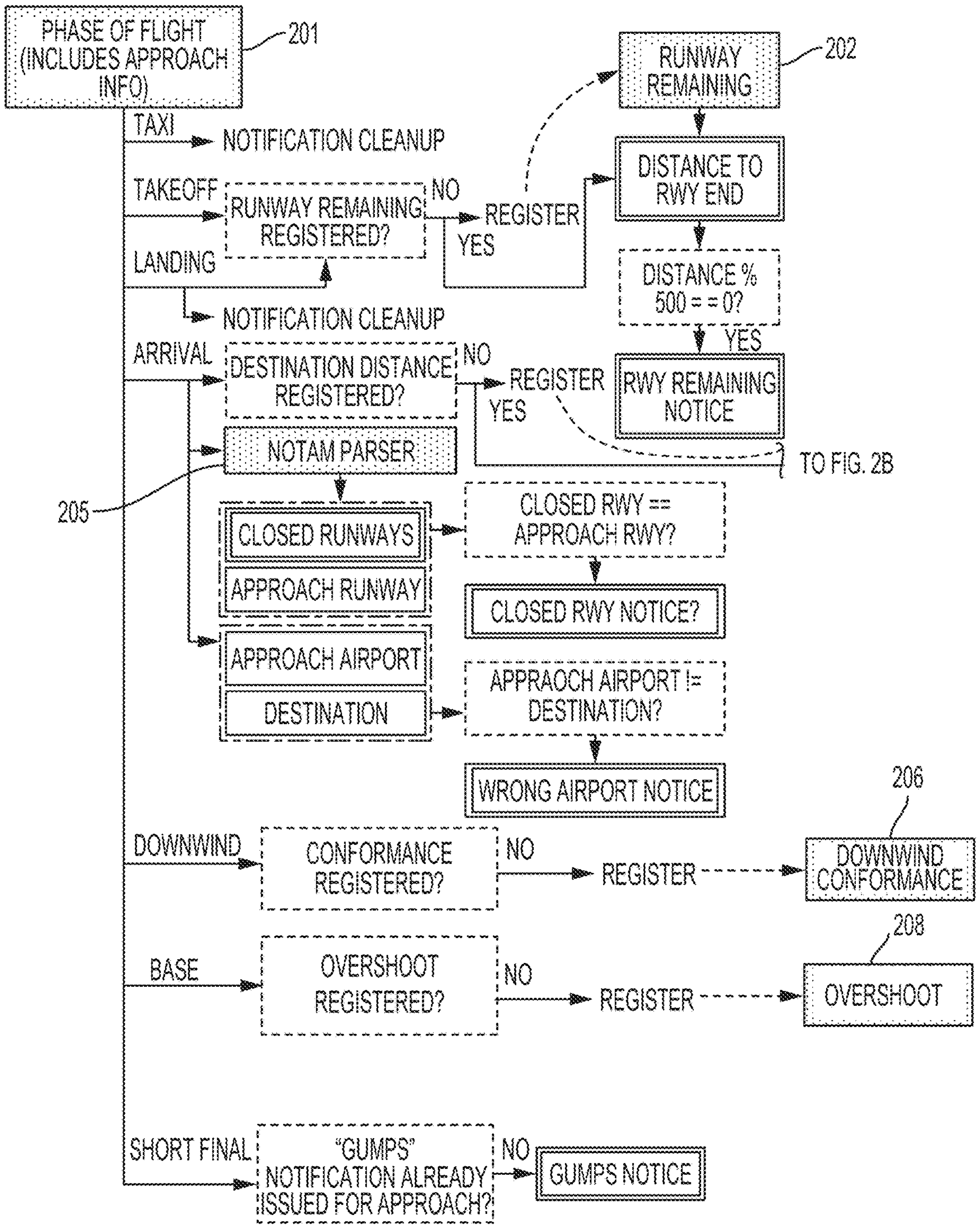
FIGS. 2A-B illustrate an example of a flowchart for processes incorporated in the digital copilot controller disclosed herein.
Figure 2B:
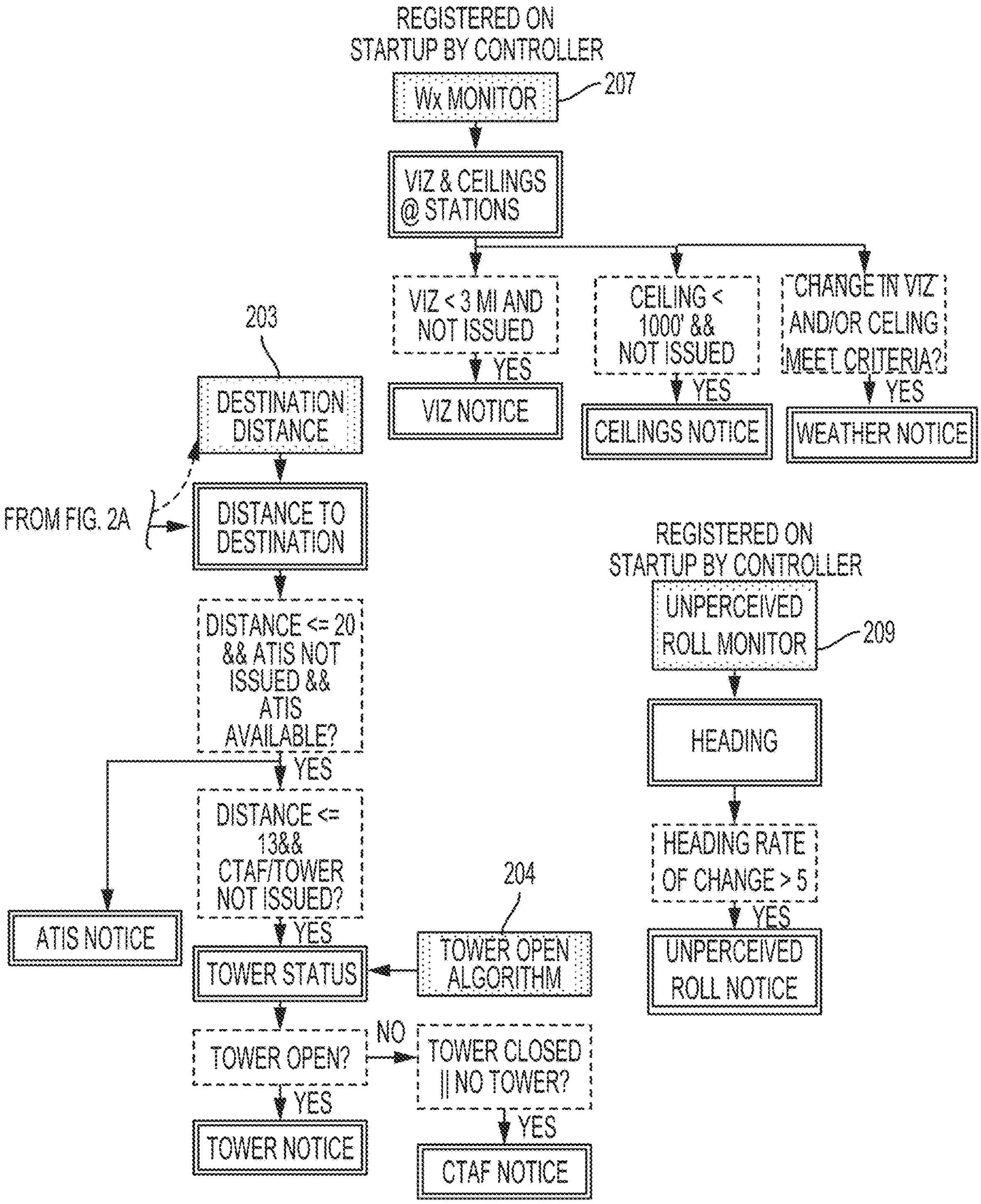

FIGS. 2A-B illustrate an example of a flowchart for processes incorporated in the digital copilot controller. In some embodiments, the controller can receive phase of flight information 201. The phase of flight information can be from another algorithm of the digital copilot as explained below. In some embodiments, the controller can register for the phase of flight algorithm and then receive the phase of flight information. In some embodiments, the controller can register for the phase of flight algorithm upon startup by the controller. In some embodiments, the phase of flight algorithm can take into account various other algorithms as explained below. For example, the phase of flight algorithm can also include information on the current traffic pattern leg. In some embodiments, the phase of flight information can include or incorporate information inputted by a user into the digital copilot controller (e.g., destination airport). In addition to the current flight phase, the controller can receive additional approach information such as the inferred destination, the approach runway, and/or the current traffic pattern leg. The inferred destination and the approach runway can be determined by other algorithms of the digital copilot or input into the digital copilot controller.

In response to receiving the phase of flight information, the controller can take various actions. If the current phase of flight is taxi, the controller can clean up various notifications. For example, the controller can remove previous notifications that have been presented to the user. In some embodiments, the controller can keep only the notifications that are relevant at the current moment. In some embodiments, the controller can remove notifications that are no longer needed unless their context is still valid. For example, the controller can remove notifications regarding distance to destination from a user interface since the user is at its destination during taxi.

If the current phase of flight is takeoff, the controller can determine if the runway remaining algorithm is registered. If it is not registered, the controller can register for the algorithm. If the controller is registered for the runway remaining algorithm or if the controller is already registered for the runway remaining algorithm 202, the runway remaining algorithm can output the distance until the end of the runway. Once the distance to end of runway is received, the controller can determine whether to notify the user of the distance to end of runway. In some embodiments, once the distance to end of runway is received, the controller can determine if the distance is divisible by a given number (e.g., 100, 250, 500 (as shown in FIG. 2), 1000 feet). If the end of runway distance is divisible by the given number, the controller can notify the user of the runway remaining distance. Such a notification can be an aural, tactile, and/or visual notification to the user of the amount of runway remaining. Accordingly, the controller can continuously provide notices to the user on amount of runway remaining based on the current phase of flight (e.g., takeoff) and the output of the runway remaining algorithm.

Similar to takeoff phase of flight, if the current phase of flight is landing, the controller can determine if the runway remaining algorithm is registered. If it is not registered, the controller can register for the algorithm. If the controller is registered for the runway remaining algorithm or if the controller is already registered for the runway remaining algorithm 202, the runway remaining algorithm can output the distance until the end of the runway. In some embodiments, the distance until end of runway can be received from another source such as user input. Once the distance to end of runway is received, the controller can determine whether to notify the user of the distance to end of runway. In some embodiments, once the distance to end of runway is received, the controller can determine if the distance is divisible by a given number (e.g., 100, 250, 500 (as shown in FIG. 2), 1000 feet). If the end of runway distance is divisible by the given number, the controller can notify the user of the runway remaining distance. Such a notification can be an aural, tactile and/or visual notification to the user of the amount of runway remaining. In addition, the notification can be updated every given number of feet of travel such as every 500 feet as shown in FIGS. 2A-B. Accordingly, the controller can continuously provide notices to the user on amount of runway remaining based on the current phase of flight (e.g., landing) and the runway remaining algorithm. In addition, if the current phase of flight is landing, the controller can clean up various notifications as explained above.

If the current phase of flight is arrival, the controller can determine if the distance to destination algorithm is registered. If it is not registered, the controller can register for the algorithm. If the controller is registered for the destination distance algorithm or if the controller is already registered for the destination distance algorithm 203, the destination distance algorithm can continually monitor the aircraft distance to the destination airport, outputting the distance for consumption at a regular interval. In some embodiments, the distance to destination can be received from another source such as user input. In some embodiments, once the distance to destination is received, the controller can determine whether to notify the user with the appropriate radio frequency for weather information (an ATIS frequency notice). For example, once the distance to destination is received, the controller can determine: (1) if the distance is less than or equal to a given distance (e.g., 5, 10, 20 (as shown in FIG. 2), 50, 100 miles); (2) if the ATIS is not issued; and/or (3) if the ATIS is available. As discussed above, The automatic terminal information service, or ATIS, can be a continuous broadcast of recorded noncontrol aeronautical information in busier airport areas. In some embodiments, if at least one of these three conditions is met, the controller can notify the user of the ATIS. Such a notification can be an aural, tactile, and/or visual notification to the user of the ATIS. In some embodiments, if all three conditions are met, the controller can notify the user of the ATIS. Accordingly, the controller can continuously provide ATIS frequency notices to the user based on the current phase of flight (e.g., arrival) and the destination distance algorithm.

In some embodiments, after at least one of these three conditions (or if all three of these conditions) is met, the controller can determine: (1) if the distance is less than or equal to a second given distance (e.g., 5, 10, 13 (as shown in FIG. 2), 50, 20 miles) and/or (2) if the CTAF or Tower frequency Notice has not been issued. In some embodiments, if at least one of these two conditions (or if both of these conditions) is met and upon receiving the tower status from a tower open algorithm, the controller can determine if the tower is open. The tower open algorithm can determine whether the airport of interest has a tower and/or whether the tower will be open at arrival. If the tower is open, the controller can provide the user with a tower frequency notice. Such a notification can be an aural, tactile, and/or visual notification to the user of the tower frequency. If the tower is closed and/or there is no tower, the controller can provide the user with a CTAF notice. Such a notification can be an aural, tactile, and/or visual notification to the user of the CTAF frequency. Accordingly, the controller can continuously provide Tower notices or CTAF notices to the user based on the current phase of flight (e.g., arrival) and the destination distance and tower open algorithms.

Irrespective of the current phase of flight, the controller can run a NOTAM parser 205. As discussed above, a notice to airmen, or NOTAM, is a notice filed with an aviation authority to alert pilots of potential hazards along a flight route or at a location that could affect the safety of the flight. The NOTAM parser can be an algorithm that ingests NOTAM data, parses it looking for specific NOTAM types, and then monitors the flight to determine if NOTAM data should be presented (e.g., closed runway notification if the approach runway is closed, localizer or other navigation equipment is out of service, etc.). For example, NOTAM parser can gather NOTAMs for the destination airport and parse through the raw text looking for instances of closed runways. If the closed runway from the NOTAM parser is the approach runway, the controller can provide the user with a closed runway notice. Such a notification can be an aural, tactile, and/or visual notification to the user that the runway to which they are currently on approach has been NOTAM'd closed. In some embodiments, the approach runway can be from the phase of flight information. Accordingly, the controller can provide closed runway notices to the user based on the current phase of flight (e.g., arrival) and the NOTAM parser.

If the current phase of flight is arrival, the controller can determine if the approach airport is the same as the intended destination airport. In some embodiments, the approach airport can be inferred from the phase of flight information. In some embodiments, the destination airport can be entered by the user. If the approach airport is not equal to the destination airport, the controller can provide the user with a wrong airport notice. Such a notification can be an aural, tactile, and/or visual notification to the user that the airport to which they are currently on approach is not the destination airport. Accordingly, the controller can provide wrong airport notices to the user based on the current phase of flight (e.g., arrival). In some embodiments, the current phases for landing include downwind (leg), base (leg), and short final (leg). These three phases correspond to three sides of a rectangular pattern that the user follows to land the plane on the approach runway. In general during visual flight operations, to land on the approach runway, the flight path starts on the downwind leg where the plane is flying parallel to the approach runway with a distance (e.g., 0.75 or 1 mile) from the approach runway.

If the current phase of flight is downwind (i.e., the traffic pattern leg is downwind), the controller can determine if the traffic pattern conformance algorithm is registered, according to some embodiments. If it is not registered, the controller can register for the traffic pattern conformance algorithm 206. Once the controller is registered for the traffic pattern conformance algorithm or if the controller is already registered for the traffic pattern conformance algorithm 206, the traffic pattern conformance algorithm can monitor the pilot's tracking of the downwind leg (i.e., the flight track parallel to runway). In other words, the traffic pattern conformance algorithm can determine whether the pilot is flying the downwind leg as expected. In some embodiments, if the algorithm detects that the pilot is drifting toward or away from the runway (rather than tracking parallel to the runway), the traffic pattern conformance algorithm can notify the user of this. Such a notification can be an aural, tactile, and/or visual notification to the user that the aircraft is drifting towards or away from the runway. In addition, the traffic pattern conformance algorithm can also determine if (at the current ground speed) it will be possible for the pilot to make the turn to base and final without overshooting the final approach course. In some embodiments, if the algorithm detects that the pilot cannot make the turn from base to final (using normal control inputs) without overshooting the final approach course, the traffic pattern conformance algorithm can provide aural, tactile, and/or visual notices to the user that the aircraft is too close to the runway to make the turn to final.

If the current phase of flight is base (i.e., the traffic pattern leg is base), the controller can determine if the overshoot algorithm is registered, according to some embodiments. If it is not registered, the controller can register for the overshoot algorithm 208. Once the controller is registered for the overshoot algorithm 208 or if the controller is already registered for overshoot algorithm 208, the overshoot algorithm can monitor the pilot's tracking of the base leg (i.e., the flight track perpendicular to runway). In some embodiments, the monitoring performed by the controller (running the overshoot algorithm) can include retrieving approach runway information for the approach airport, receiving Global Positioning System (GPS) location of the plane, receiving a speed of airplane, a wind speed, or a combination thereof. For example, approach runway information may include location of the approach runway, altitude of the approach runway, preferred approach runway based on current winds, and traffic pattern direction. In some embodiments, based on the monitored information, the overshoot algorithm computes the geometric flight path needed to be followed to turn the plane to enter the short final phase. In some embodiments, if the algorithm detects that the geometric path requires that the plane turn at an angle greater than a threshold angle, then the algorithm can notify the user of possible overshoot in transitioning to the short final phase. In some embodiments, the algorithm adjusts the threshold angle based on approach runway information for the approach airport, receiving GPS location of the plane, receiving a speed of airplane, a wind speed, stored aircraft performance parameters, or a combination thereof. Such a notification can be an aural, tactile, and/or visual notification to the user that the aircraft is likely to overshoot the final approach course. Accordingly, the user may heed the overshoot notification, abandon the current landing attempt, and return to the air to prevent a possible accident. The next instance that the plane enters the base phase, the user can control the plane to turn earlier to prevent possible overshoot.

Figure 3:
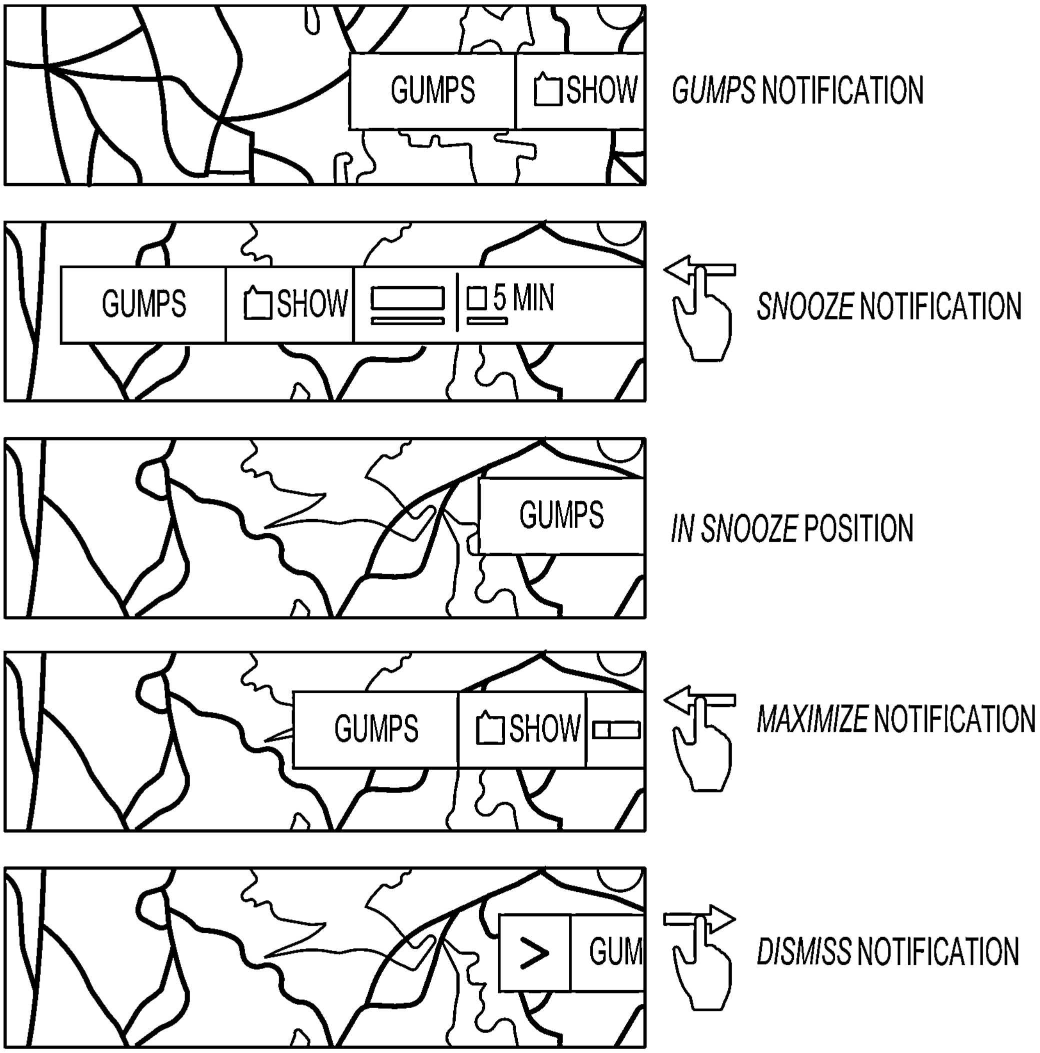
FIG. 3 illustrates an example of a notification that can be displayed on a graphical user interface disclosed herein.

If the current phase of flight is short final, the controller can determine if a "GUMPS" notification has already been issued for approach. GUMPS (i.e., Gas, Undercarriage, Mixture, Propeller, Seat belts and Switches) is a widely used acronym for a mental checklist to ensure nothing critical has been forgotten before landing. If a GUMPS notification has not been issued, the controller can issue a GUMPS notice. Such a notification can be an aural, tactile, and/or visual notification to the user that the GUMPS check should be completed. For example, FIG. 3 illustrates an example of a GUMPS notification that can be displayed on a graphical user interface. The graphical user interfaces disclosed herein can also be touch-sensitive displays. As such, the user can perform a gesture on the GUMPS notification (or any other notification) on the display in order to snooze, maximize, and/or dismiss the notification as shown in FIG. 3. The gestures can be, for example, a swipe gesture, a tap gesture, a double tap gesture, and so on. The interactions described for the above GUMPS notifications can apply to all notifications from the digital copilot. In one or more examples, the controller can determine if the aircraft is on short final, but is not aligned with any runway. In this case, a notification that the aircraft is not approaching a runway can be triggered Like the others, the notification can be aural, tactile, and/or visual.

In some embodiments, prior to the landing phase of flight, the controller can register for a pattern entry guidance algorithm if not already registered. In some embodiments, the pattern entry guidance algorithm retrieves approach runway information from a database based on the approach airport and accesses current wind and traffic information to determine preferred approach runway. The approach runway information may include the dimensions of the runway, turn directions, and a suggested rectangle pattern (or path) to follow, or other information included in the Federal Aviation Regulations Aeronautical Information Manual (FAR/AIM) for the approach airport. In some embodiments, the controller can plot the suggested rectangle pattern on a user interface such as the map GUI as described with respect to FIGS. 14 and 15.

In any phase of flight, the controller can determine if a checklist notification has been issued for an applicable checklist, and if it has not been issued, the controller can issue the checklist notice. Examples of applicable checklists include, for example, a before takeoff checklist, a before landing checklist, an emergency checklist, and the like.

In some embodiments, the controller can register the weather monitor 207. In some embodiments, the controller can register for the weather monitor upon startup by the controller. In some embodiments, the weather monitor can periodically (e.g., every 5, 10, 15, minutes etc.) receive weather information (e.g., visibility and ceiling values as shown in FIG. 2B) from one or more weather stations. In some embodiments, the weather monitor can continuously monitor the one or more weather stations for weather information, i.e., the weather monitor is always listening for broadcasts. For example, weather information may include any of visibility, ceilings, forecasted weather, dew point temperature, wind speed, wind direction, thunderstorm intensity, or the like. In some embodiments, the one or more weather stations include a plurality of airports throughout the country including, e.g., the destination airport. In some embodiments, the weather information can be received via Flight Information Services Broadcast transmitted by the one or more weather stations. In some embodiments, the weather monitor can include wireless interfaces (e.g., a FIS-B receiver, etc.) for receiving the weather information. Further, the weather monitor can include wired (e.g., USB) or wireless interfaces (e.g., Bluetooth, Wi-Fi, etc.) for communicating monitored information to the controller.

In some embodiments, the weather monitor can store the received weather information in a database associated with the controller. The controller may periodically (e.g., every 5, 10, or 15 minutes etc.) analyze the weather information stored by the weather monitor to determine what notification to transmit to the user. Such a notification can be an aural, tactile, and/or visual notification to the user of the visibility. For example, upon receiving the visibility and ceilings from the weather monitor, the controller can determine whether to send a visibility and ceiling notice to the user. In some embodiments, if the visibility is less than a certain distance (e.g., 1, 2, 3 (as shown in FIG. 2), 4, 5 miles) and/or if the visibility notice has not been issued, the controller can notify the user of a visibility notice. In some embodiments, if the ceiling is less than a certain distance (e.g., 500, 750, 1000 (as shown in FIG. 2), 1500 feet) and/or if the ceiling notice has not been issued, the controller can notify the user of a ceiling notice. Accordingly, the controller can continuously provide notices to the user on ceiling and visibility based on the weather monitor. In some embodiments, the ceiling and visibility notifications are not based on the phase of flight.

In some embodiments, the controller can analyze the stored weather information to determine whether a change in visibility and/or ceiling meet predefined criteria. In some embodiments, the visibility and/or ceiling include values from a first weather station corresponding to the destination airport, a second weather station corresponding to the closest airport, or a plurality of weather stations (which may include the first or second weather stations) on the flight route. Based on the change in received weather information, the controller can provide a weather notice. For example, if the visibility for a weather station closest to the plane decreases by a threshold amount (i.e., the change in visibility exceeds the threshold amount), then the controller may generate a weather notice that alerts the user of decreasing weather conditions. In some embodiments, the weather notice can be provided by the controller aurally, tactilely, or visually. For example, the controller can plot visual notifications on a user interface (e.g., a map graphical user interface as described with respect to FIGS. 13-14) to indicate the change in weather conditions. In some embodiments, the threshold values can be set by the user.

In some embodiments, based on the generated notices (e.g., visibility notice, ceilings notice, or weather notice), the controller can propose alternate flight routes to the user. For example, the controller can plot a proposed flight route on the user interface discussed above.

In some embodiments, the controller can register unperceived roll monitor 209. In some embodiments, the controller can register for unperceived roll monitor 209 upon startup by the controller. In some embodiments, the controller can register unperceived roll monitor 209 once the phase of flight algorithm described with respect to FIGS. 4A, 4B, and 5 indicate that the phase of flight is en route, maneuver, unknown, or a combination thereof. Unperceived roll monitor 209 can be used by the controller to determine whether the plane is entering an unperceived roll. A user may not be aware of the plane going into a roll if the user is not looking outside the window, due to poor visibility, or the user is turning the plane so slowly that the vestibular system doesn't register the motion.

In some embodiments, unperceived roll monitor 209 can periodically (e.g., every 1, 1.5, or 2 seconds) monitor a heading across a period of time (e.g., 20 seconds, 30 seconds, etc.). In some embodiments, unperceived roll monitor 209 receives the heading from a heading indicator or a GPS that incorporates the heading indicator. In some embodiments, the controller can track a rate of change of the heading based on the heading information received from unperceived roll monitor 209. Then, based on a trend of the rate of change of the heading over a set period of time (e.g., 20, 25, 30, 35, or 40 seconds) on a rolling basis \, the controller can issue an unperceived roll notice. In some embodiments, the controller compares the trend being tracked with an expected trend line for the unperceived roll such that if the tracked trend fits the expected trend line, the controller generates an unperceived roll notice to provide to the user. In some embodiments, the controller can determine a fit between the tracked trend and the expected trend line if the Root Mean Square Error between the trend line is less than a predefined value. In some embodiments, the expected trend line can be dynamically updated by the controller based on a rate of change of the heading, a length of the set period of time used in tracking the trend, or a combination thereof. In some embodiments, the unperceived roll notice can be provided by the controller aurally, tactilely, and/or visually. Generally, when a user is consciously turning, the heading would change at a constant rate (e.g., 2 or 3 degrees a second). Accordingly, an increasing rate of change less than a threshold amount may indicate that the rate of change of the heading had been increasing within the period of time without the user noticing. This trend in the rate of change of the heading would be tracked within the set period of time, as discussed above.

Besides the notifications described above, the controller can notify the user of a wide variety of notifications including custom notifications. In some embodiments, the controller can register for an altitude monitoring algorithm. The altitude monitoring algorithm can monitor altitude conformance and alert the user if he deviates from a set altitude. In some embodiments, the altitude monitoring algorithm can be registered by the controller during the arrival phase. In some embodiments, the controller can retrieve instrument approach (or instrument approach procedure (IAP)) information to determine an altitude threshold or range appropriate for a segment (or phase) of the instrument approach. In some embodiments, the controller determines the current segment based on the GPS and orientation information of the plane. For example, during a specific segment, the instrument approach may require the pilot pass that specific segment at or above 3000 feet. In this example, the controller can alert the user of non-compliance if the altitude falls below the 3,000 feet altitude threshold. Such a notification can be an aural, tactile, and/or visual notification to the user.

In some embodiments, the controller can register for a hold monitoring algorithm. The hold monitoring algorithm can monitor for the hold join and provide countdown timers or distance remaining notifications throughout the hold. Such a notification can be an aural, tactile, and/or visual notification to the user. In some embodiments, the controller can register for a taxi conformance algorithm. The taxi conformance algorithm can ingest a taxi clearance and monitor conformance with the assigned taxi route. The controller can then provide the user with turn-by-turn taxi route guidance notifications and can provide notification if a deviation from the planned taxi route is detected. These notifications can be provided aurally, tactilely, and/or visually to the user.

In some embodiments, the controller can register for a flight stability algorithm. The flight stability algorithm can identify deviations from "ideal" flight path (e.g., monitoring stability during pattern operations and practice maneuvers). The user can then receive notifications if the flight stability deviates from the ideal flight path. These notifications can be provided aurally, tactilely, and/or visually to the user.

In some embodiments, the controller can register for an airspace incursion/excursion algorithm. The airspace incursion/excursion algorithm can monitor and provide the pilot with notifications if the flight path and/or current trajectory is trending toward penetrating or exiting a particular airspace. These notifications can be provided aurally, tactilely, and/or visually to the user.

In some embodiments, the controller can register for a hazards algorithm. The hazards algorithm can identify if the flight is moving towards hazards like terrain, obstacles, traffic, or weather. The user can then be provided with notifications at an early enough point for the user to make decisions and take corrective actions to remain clear of any hazards. In some embodiments, the controller can register for a 4D Flight Plan Conformance algorithm. The 4D flight plan conformance algorithm can monitor the ability of pilots to conform with multi-waypoint flight plans with target altitudes (and possibly time-of-arrival). The pilot can be notified of any deviations during flight progress. In some embodiments, the controller can register for a communication frequency monitoring algorithm. The communication frequency monitoring algorithm can use speech recognition to listen to ATC clearances and/or instructions and capture those relevant to the flight. Once captured, these ATC clearances can be implemented automatically (subsequently monitored for conformance) and verify correct readback. For example, if an ATC clearance amended the altitude for a charted crossing restriction, this new information could be incorporated into the conformance monitoring algorithm for that crossing. In some embodiments, the controller can register for an instrument flight support algorithm. The instrument flight support algorithm can monitor key approach information with a "just-in-time" model. The user can then be reminded of these key approach items (e.g., decision height, initial missed approach steps, etc.). In some embodiments, the controller can register for a cognitive assistance algorithm. The cognitive assistance algorithm can implement machine learning algorithms to track pilot behavior over time and provide tailored information to pilots (e.g., less information about familiar airports, more information about unfamiliar airports). As such, the digital copilot could better infer a pilot's intent through machine learning across both individual pilots as well as by aggregating across all pilots using the digital copilot over time. In some embodiments, the controller can register for an active runway algorithm as discussed below. The active runway algorithm can determine where the aircraft currently is within a runway boundary and, if so, whether aligned with the runway. The user can receive notifications if the aircraft is not aligned with the active runway.

Although the digital copilot controller can detect if the algorithms are registered based on a given phase of flight, if the phase of flight changes, the controller can also unregister for an algorithm that is no longer being used, given the change of flight phase. In addition, with any notification, the user can request to receive certain notifications based upon user set parameters. For example, the pilot can ask to receive notifications if the ceilings get below 3000 feet at the destination airport even if the initial set up of the controller would not start sending ceiling notifications until the ceiling was below 1000 feet.

Phase of Flight Algorithm

Figure 4A:
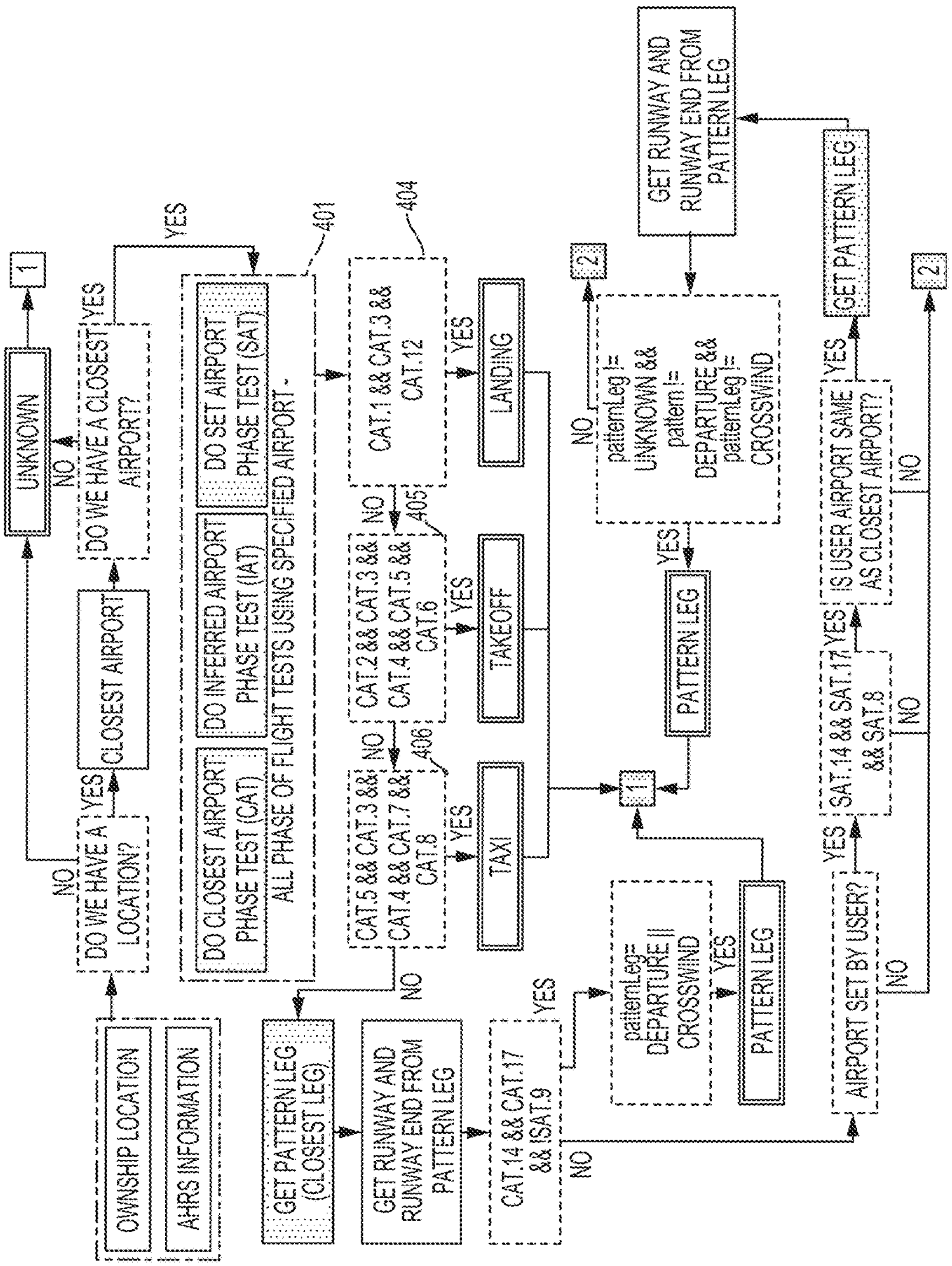
FIGS. 4A-B illustrate an example of a phase of flight algorithm disclosed herein.
Figure 4B:
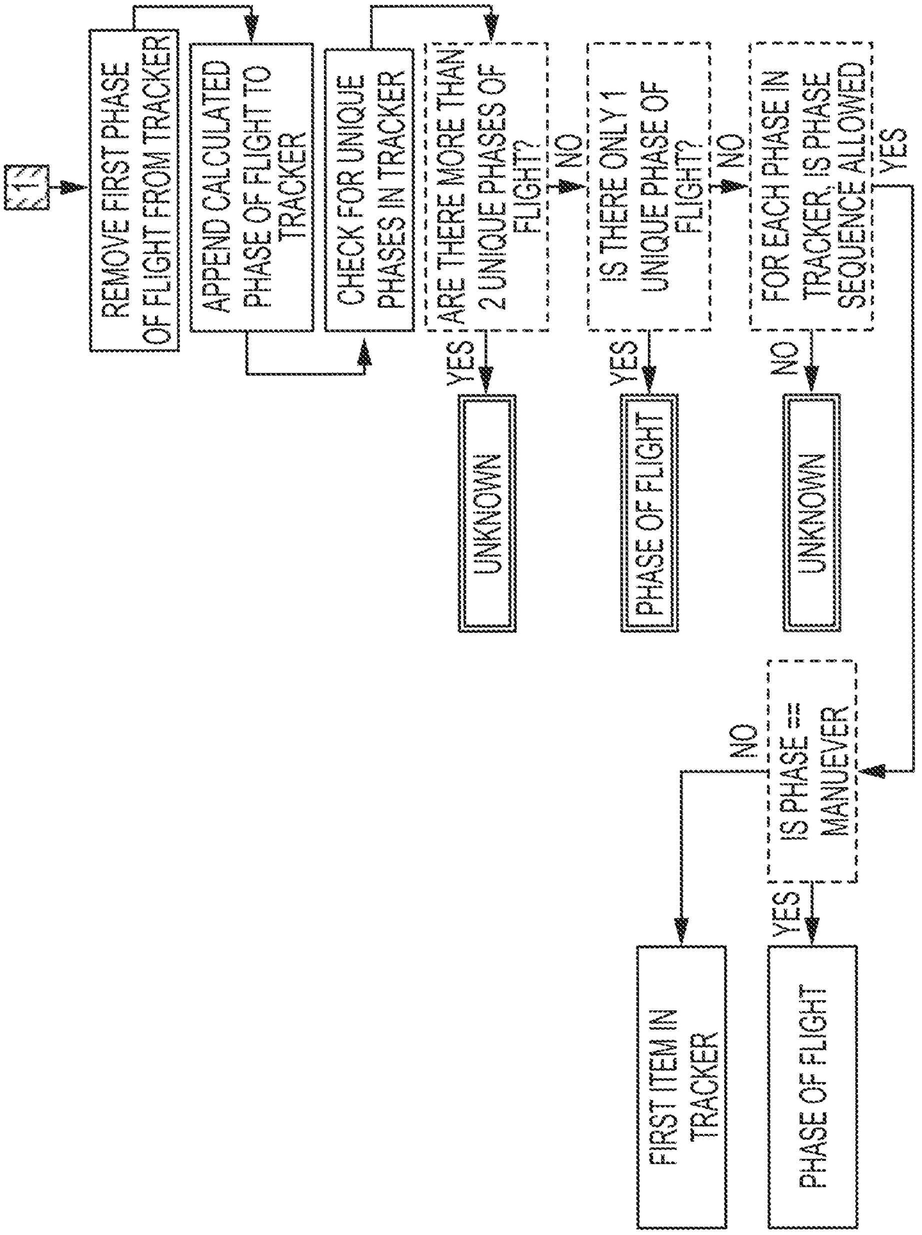
Figure 5:
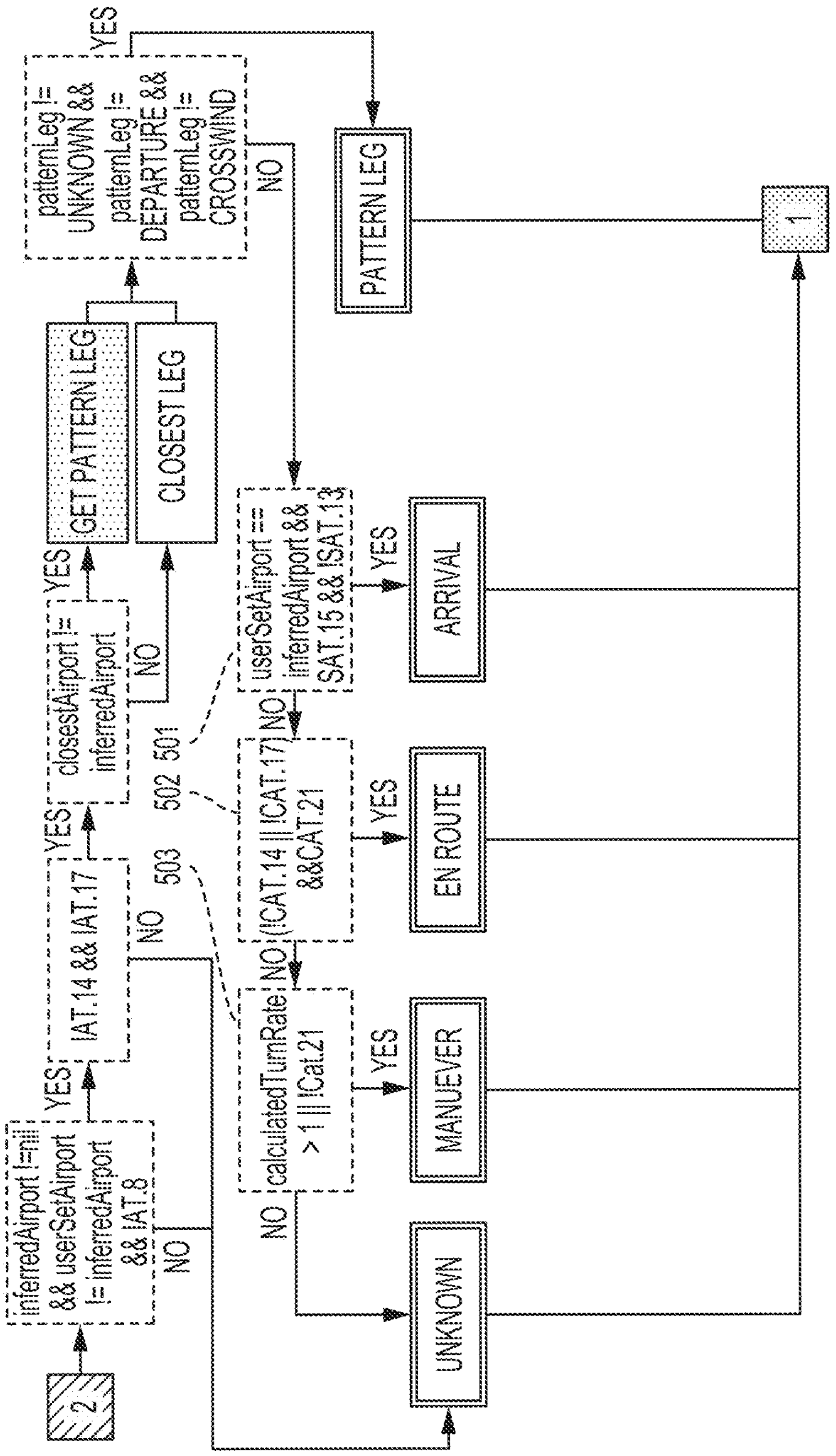
FIG. 5 illustrates a continuation of the example phase of flight algorithm of FIGS. 4A-B.
Figure 6A:
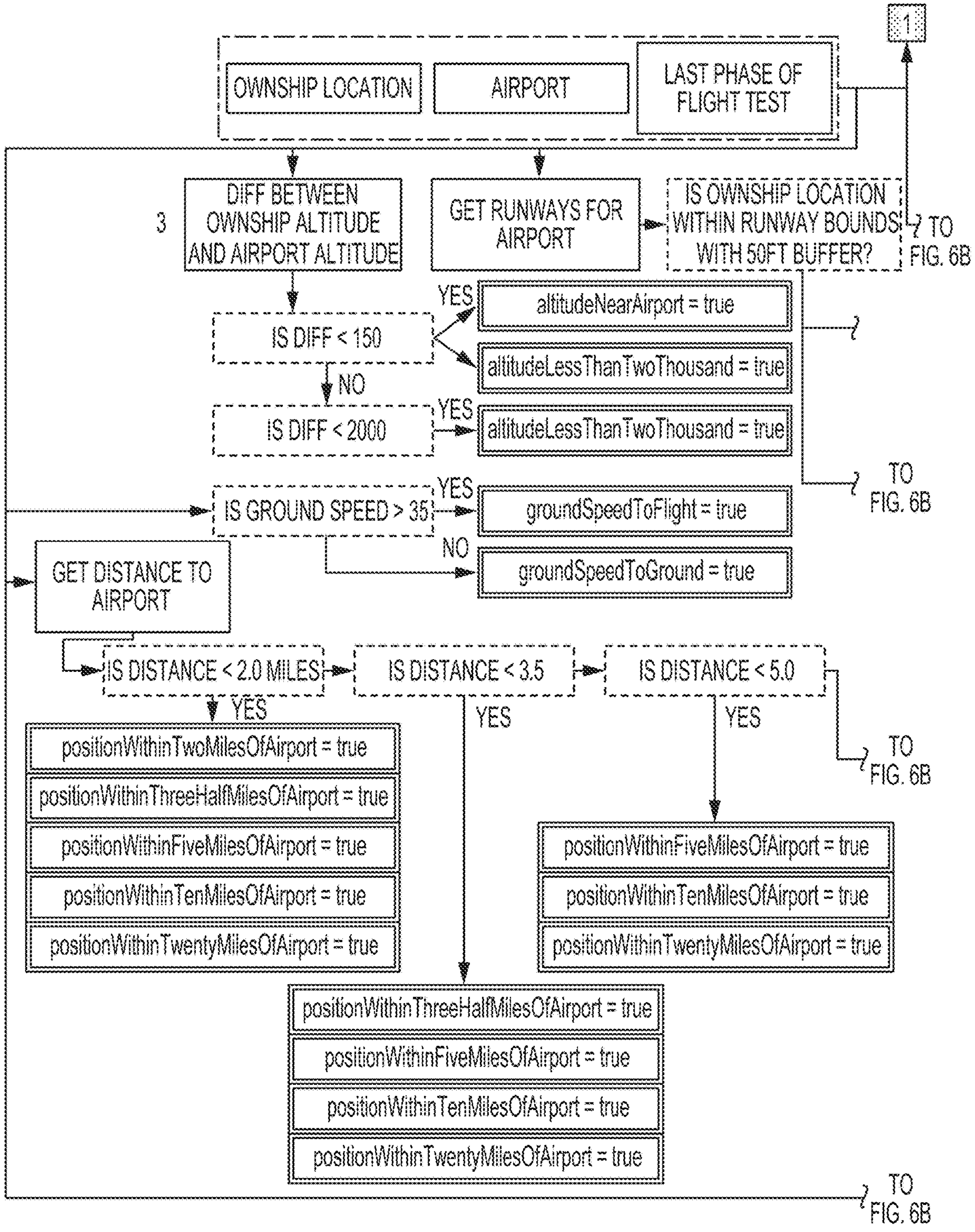
FIGS. 6A-B illustrate an example of a phase of flight test disclosed herein used in a phase of flight algorithm.
Figure 6B:
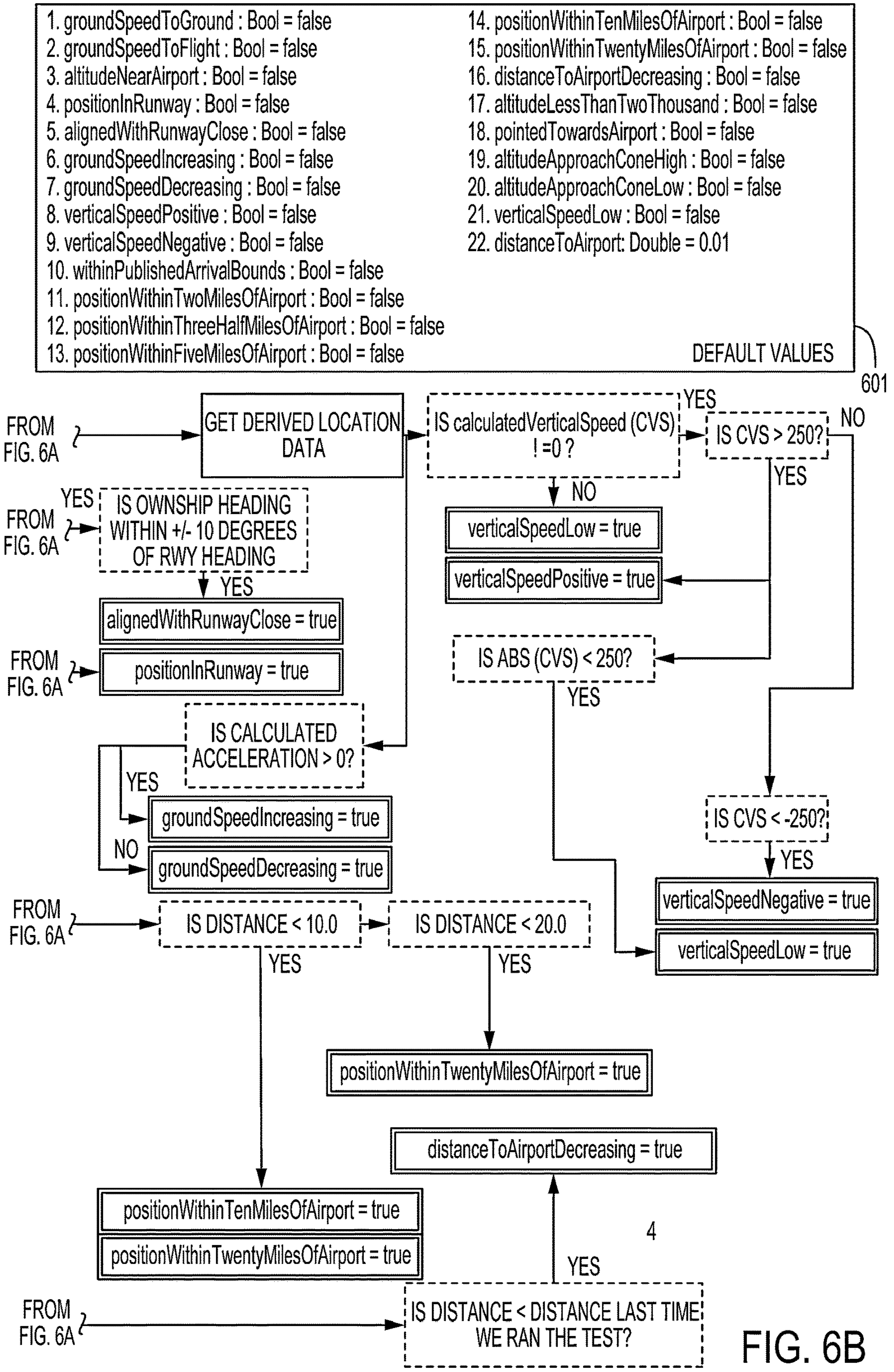
Figure 7:
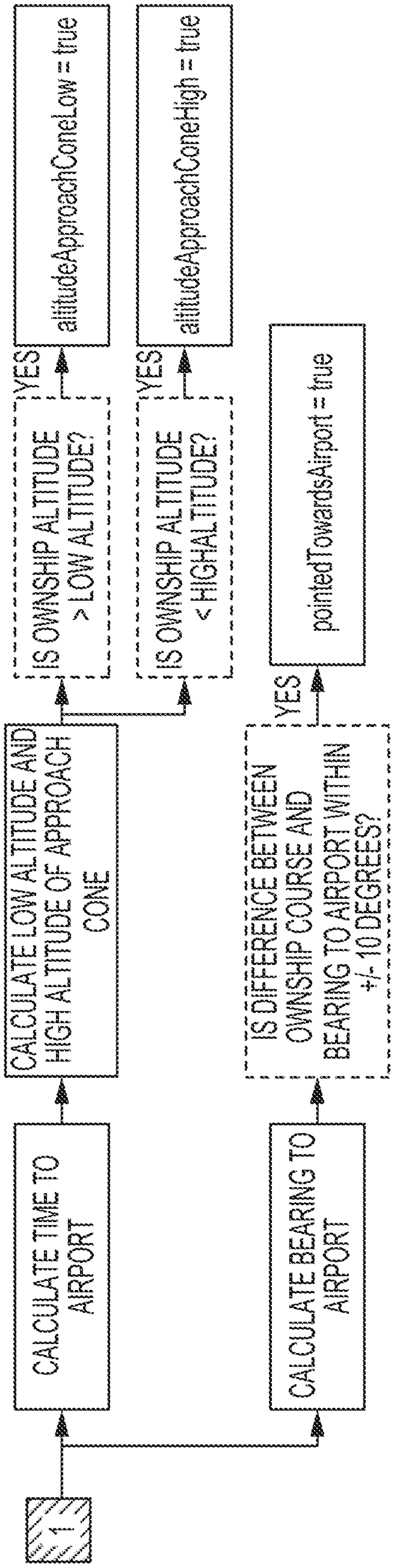
FIG. 7 illustrates a continuation of the example phase of flight test of FIGS. 6A-B.

In some embodiments, the phase of flight algorithm can operate in two stages: categorization (e.g., as shown in FIGS. 4A and 5) and sensibility (e.g., as shown in FIG. 4B). In some embodiments, in the categorization stage, to determine the phase of flight, the phase of flight algorithm can analyze aircraft data to determine the phase of flight. In some embodiments, the phase of flight algorithm calculates the aircraft's current distance to a specified airport, the aircraft's altitude relative to the specified airport, the aircraft's ground speed, and the aircraft's vertical speed. These calculated characteristics define an aircraft state and can be used by the phase of flight algorithm to calculate a set of Boolean metrics for the closest airport, the declared destination airport, and the inferred destination airport. For example, as will be further described with respect to FIGS. 6A-B and 7, vertical speed may be converted into Boolean metrics that categorize the vertical speed as positive (e.g., the aircraft is climbing faster than 250 feet per minute), or negative (e.g., the aircraft is descending faster than 250 feet per minute). In some embodiments, the phase of flight algorithm uses the calculated set of Boolean metrics (e.g., as shown in FIGS. 6A, 6B, and 7) to determine the phase of flight. In some embodiments, the phase of flight can be one of the following possible phases of flight: taxi, landing, takeoff, departure, approach, arrival, en route, maneuver, and unknown. In the categorization stage, the potential phases of flight can then be evaluated in a set order (e.g., the order above listing the possible phases of flight). Once a set of metrics for a potential phase of flight matches the calculated set of Boolean metrics, the phase of flight can be returned and no further phases are tested. In some embodiments, the phase of flight algorithm can enter the sensibility stage upon completing the categorization stage where a phase of flight is identified. In the sensibility stage, the phase of flight algorithm can assess whether the identified phase of flight is reasonable, given one or more of the previously identified phases of flight.

FIGS. 4A-B and 5 illustrate an example of a phase of flight algorithm including a categorization stage and a sensibility stage. Upon initiation of the phase of flight algorithm, it can request information from a data manager. The data manager can be running in the background collecting data regarding aircraft state and location whether that be from the real world, location information, pseudo location information and can provide such information when requested. In some embodiments, the information requested can include information related to ownship location or information provided by an Attitude Heading and Reference System (AHRS) device. The information related to ownship location could be from the real-world, real-time simulation, or recorded data. In some embodiments, the information related to ownship location can include an XYZ position, a longitude and latitude pair, or various derived data such as accelerations, velocities, etc. In some embodiments, information provided by an AHRS device (or other external sensors) can include attitude information such as roll, pitch, yaw, turn rate, etc., as well as Angle of Attack (AoA), airspeed, etc. and this information can replace some of the derived data.

The phase of flight algorithm can then determine if it actually has an ownship location. If there is no location of the aircraft, then the algorithm can mark the phase of flight as unknown. If the algorithm does have a location, the algorithm can look for the closest airport to the aircraft. If there is not a closest airport, then the algorithm can set the phase of flight as unknown. In some embodiments, the closest airport can be the closest airport within a given distance (e.g., 10, 25, 50 miles). If the algorithm does have a closest airport, then a phase of flight test 401 can be run at three different airports. These three airports can be: (1) the closest airport; (2) the inferred airport; and (3) the declared destination airport. In some embodiments, the inferred airport can be obtained from the inferred destination airport algorithm discussed below. As will be described below with respect to FIGS. 4A, 4B, and 5, a set of Boolean metrics calculated with respect to one or more of the above airports (1), (2), and (3) may be retrieved depending on which phase of flight is being tested. For example, as shown in boxes 404, 405, or 406 of FIG. 4A, Boolean metrics calculated with respect to the closest airport may be used to evaluate whether the current phase of flight is landing, takeoff, or taxi, respectively.

FIGS. 6-7 illustrate an example of a phase of flight test used by the phase of flight algorithm. The phase of flight test can use Boolean metrics/values. For example, in FIGS. 6A-B, box 601 can include all the different Boolean metrics (1-22) for various aircraft characteristics that are being set. In some embodiments, the initial Boolean metrics 1-22 for various aircraft characteristics can be set at their default values. The phase of flight test can then use the information from the ownship location, airport, and last phase of flight test to change these Boolean metrics as shown in FIGS. 6A-B. At least some of the Boolean metrics can be designated as true or false. The designation or condition of these Boolean values can then be used back in the phase of flight algorithm.

The phase of flight test can start with receiving the ownship location, an airport (i.e., one of three airports referenced above), and the last phase of flight test. The last phase of flight test can be replaced each time a phase is calculated. However, the last phase of flight test can start as null.

The phase of flight test can get derived location data. From the derived location data, the test can determine if the calculated acceleration is greater than 0. If the calculated acceleration is greater than 0, the test can set the groundspeedincreasing value to true. If the calculated acceleration is not greater than 0, the test can set the groundspeeddecreasing value to true. From the derived location data, the test can also determine if the aircraft is climbing, roughly level, or descending (i.e., intentionally climbing at a reasonable rate, intentionally descending at a reasonable rate, or basically staying level). For example, from the derived location data, the test can determine if the calculated vertical speed (cvs) is not equal to 0. If the calculated vertical speed is equal to 0, the test can set the verticalspeedlow value to true. If the cvs is not equal to 0, the test can determine if the cvs is greater than a set value (e.g., 250 fpm). If the cvs is greater than the set value, the test can set the verticalSpeedPositive value to true and can determine if the absolute value of cvs is less than the set value. If the absolute value of cvs is less than the set value, the test can set the verticalSpeedLow value to true. If the cvs is less than the set value, the test can determine if the cvs is less than −set value (e.g., −250 fpm). If the cvs is less than −set value, the test can set the verticalSpeedNegative value to true.

The phase of flight test can also get all the runways for the given airport. The test can see if the aircraft is on the runway and intending to go down the runway (i.e., on and aligned with the runway). For example, the test can then see if the location of the aircraft is within the runway bounds with a buffer (e.g., 50 ft as shown in FIG. 6). If the aircraft is within the runway bounds with a buffer, the test can set the positioninrunway value to true and the test can determine if the ownship heading is within a set number of degrees (e.g., +/−10) of the runway heading. If the ownship heading is within a set number of degrees, the test can set the alignedwithrunwayclose value to true.

The phase of flight test can also obtain the difference between the ownship altitude and airport altitude (i.e., altitude above ground level). With the differences between the ownship altitude and airport altitude, the test can determine whether the aircraft is on the ground at an airport, near an airport in altitude, or flying over the top of an airport at an altitude sufficient to suggest the pilot has no intent to land at the airport. If the difference is less than a given value (e.g., 150 feet), the test can set the altitudenearairport value to true and the altitudelessthantwothousand value to true. If the difference is not less than the set value, the test can determine if the difference is less than a second set value (e.g., 2000 ft). If the difference is less than a second set value, the test can set the altitudelessthantwothousand value to true.

The phase of flight test can also determine if the ground speed is greater than a given value (e.g., 35). If the ground speed is greater than a given value, the test can set the groundspeedtoflight value to true. If the ground speed is not greater than a given value, the test can set the groundspeedtoground to true.

The phase of flight test can also obtain the distance from the aircraft to the airport. The phase of flight test can then determine if the distance to the airport is less than a certain number of values (e.g., 2, 3.5, 5, 10, and 20 miles). For example, if the distance is less than 2 miles, the test can set the positionwithintwomilesofairport value, positionwithinthreemilesofairport value, positionwithinfivemilesofairport value, positionwithinttenmilesofairport value, and the positionwithintwentymilesofairport value to true. If the distance is less than 3.5 miles, the test can set the positionwithinthreemilesofairport value, positionwithinfivemilesofairport value, positionwithinttenmilesofairport value, and the positionwithintwentymilesofairport value to true. If the distance is less than 5 miles, the test can set the positionwithinfivemilesofairport value, positionwithinttenmilesofairport value, and the positionwithintwentymilesofairport value to true. If the distance is less than 10 miles, the test can set the positionwithinttenmilesofairport value and the positionwithintwentymilesofairport value to true. If the distance is less than 20 miles, the test can set the positionwithintwentymilesofairport value to true. In addition, the phase of flight test can also determine if the distance from the aircraft to the airport is less than this distance the last time this test was ran. If the new distance is less than the last time the test was ran, the test can set the distancetoairportdecreasing value to true.

The phase of flight test can also calculate the time to the airport (FIG. 7). In addition, the phase of flight test can calculate the low altitude and high altitude of an approach cone. By calculating the low and high altitude of the approach cone, the phase of flight test can determine if the approach of the aircraft to the airport is on a normal approach angle. If an aircraft were to descend to an airport at a given rate (e.g., 500 fpm), a buffer can be created around that rate to create an imaginary cone of potential descent paths if the aircraft descended at a higher or lower rate. Accordingly, the phase of flight test can check to see if the aircraft is within the approach cone. If the ownship altitude is greater than the low altitude of the approach cone, the test can set the altitudeapproachconelow value to true. If the ownship altitude is less than the high altitude of the approach cone, the test can set the altitudeapproachconehigh value to true.

The phase of flight test can also calculate the bearing to the airport. For example, if the difference between the ownship course and the bearing to the airport is within a certain degree range (for example, +/−10), the test can set the pointedtowardsairport value to true.

As stated above and returning back to FIG. 4A, the phase of flight test can be run at three different airports: (1) the closest airport; (2) the inferred airport; and (3) the set destination airport. As such, these tests can be labeled as the closest airport phase test (CAT), inferred airport phase test (IAT), and set airport phase test (SAT). The phase of flight algorithm can then use the various Boolean values from each of the phase of flight tests of the three airports. For example, as shown in FIGS. 4A-B, CAT.1 corresponds to the first Boolean value in box 601 of FIGS. 6A-B for the closest airport phase test. In other words, CAT.1 is the groundspeedtoground value for the closest airport phase of flight test and CAT.17 is the altitudelessthantwothousand value for the closest airport phase of flight test. Similarly, SAT.1 is the groundspeedtoground value for the set destination airport phase of flight test and IAT.1 is the groundspeedtoground value for the inferred airport phase of flight test.

From the closest airport phase of flight test as shown in FIG. 4, the phase of flight algorithm can proceed to identify a phase of flight by evaluating a set of potential phases of flight one by one until the required metrics for the potential phase of flight being evaluated matches the set of Boolean metrics calculated based on received flight data, e.g., ownship location, AHRS information, etc. In some embodiments, the phase of flight algorithm can identify a potential phase of flight periodically, e.g., every 1, 2, or 3, seconds.

In some embodiments, as described with respect to FIGS. 6A, 6B, and 7, the set of Boolean metrics relate to the aircraft's current distance to a specified airport, the aircraft's altitude relative to the specified airport, the aircraft's ground speed, and the aircraft's vertical speed. In some embodiments, the potential phases of flight can be evaluated in a predetermined order, e.g., in the following order: taxi, landing, missed approach, takeoff, taxi, departure, approach, arrival, en route, maneuver, and unknown.

In evaluating the taxi phase, the current phase of flight can be identified as taxi if the aircraft has a "low" ground speed, be a "short" distance from the airport, and has an altitude that is "close" to the airport's altitude, where the criteria for "low," "short," and "close" are set according to aircraft type. If not, the phase of flight may proceed with evaluating a next potential phase of flight.

In evaluating the takeoff phase, the current phase of flight can be identified as takeoff if the aircraft has a "high." "increasing" speed, an altitude that is "low" as measured relative airport elevation, on or over a runway, and is aligned with that runway. If not, the phase of flight may proceed with evaluating a next potential phase of flight.

In evaluating the departure phase, the current phase of flight can be identified as departure if the aircraft is within 10 miles of the airport, within 2000' feet above the airport, exceeding a specified rate of climb, and the traffic pattern leg algorithm returns departure.

In evaluating the approach phase, the current phase of flight can be identified as approach if the traffic pattern leg algorithm determines the aircraft is on the overhead, join, downwind, base, or short final leg.

In evaluating the arrival phase, the current phase of flight can be identified as arrival if the aircraft is between 5 and 20 miles (values may vary by aircraft type) of the destination airport set by the pilot, and the set destination agrees with the destination as determined by the inferred destination algorithm.

In evaluating the en route phase, the current phase of flight can be identified as en route if the aircraft is level (allowing for modest rates of climb or descent), and either more than 10 miles from the specified airport or at an altitude greater than 2000' above that same airport.

In evaluating the maneuver phase, the current phase of flight can be identified as maneuver if the aircraft is climbing or descending at a rate higher than a specified threshold, or if the turn rate exceeds 1 degree per second.

If the current phase of flight is not identified as any of the above potential phases of flight, the phase of flight can be set to unknown.

FIGS. 4A, 4B, and 5 illustrate the above evaluations in greater detail. For example, as shown in FIG. 4, if the various Boolean values corresponding to the closest airport phase of flight meet the conditions set in boxes 404, 405, or 406, the phase of flight can be landing, takeoff, or taxi. For example, if CAT.1, CAT.3, and CAT.12 are all true, then the phase of flight can be landing.

If the phase of flight algorithm cannot determine whether the phase of flight is landing, takeoff, or taxi, the phase of flight algorithm can obtain the pattern leg. In some embodiments, the pattern leg is obtained from the traffic pattern leg algorithm discussed below. In some embodiments, the pattern leg obtained can be the pattern leg of the closest airport ("closest leg"). Based off of the pattern leg, the phase of flight algorithm can obtain the runway and runway end. The phase of flight algorithm can then use information from the closest airport phase of flight test (e.g., CAT.14 and CAT.17) and the set airport phase of flight test (e.g., SAT.9) to determine if the pattern leg is a departure or crosswind pattern leg. The phase of flight can then be the departure or crosswind pattern leg.

The phase of flight algorithm can also use information from the closest airport phase of flight test (e.g., CAT.14 and CAT.17) and the set airport phase of flight test (e.g., SAT.9) to determine if the airport has been set by the user. If the airport was not set by the user, the phase of flight algorithm can take into account the inferred airport as shown in FIG. 5. If the airport was set by the user and based on information from the set airport phase of flight test (e.g., SAT.14, SAT.17, and SAT.8), the algorithm can determine if the user set airport is the same as the closest airport. If the user set airport is the same as the closest airport, the process can then obtain the pattern leg. In some embodiments, the pattern leg is obtained from the traffic pattern leg algorithm discussed below. Based on the pattern leg, the algorithm can obtain the runway and runway end. The phase of flight algorithm can then check if the pattern leg is not unknown, not departure, and not crosswind. If this is correct, the phase of flight algorithm can then set the phase of flight to the pattern leg obtained. In some embodiments, the pattern leg here can be overhead, join, downwind, final, or base. In some embodiments, the phase of flight algorithm can set the phase of flight to approach if the pattern leg is determined to be the overhead, join, downwind, final, or base.

If the airport is not set by the user, the information from the set airport phase of flight test (e.g., SAT.14, SAT.17, and SAT.8) is not true, or the set airport is not the same as the closest airport while the information from the set airport phase of flight test (e.g., SAT.14, SAT.17, and SAT.8) is true, the phase of flight algorithm can determine: (1) if the inferred airport is not unknown; (2) if the user set airport is not the inferred airport; and (3) if information from the inferred airport phase of flight test (e.g., IAT.8) is true, as shown in FIG. 5 according to some embodiments. If the inferred airport is unknown, or the phase of flight cannot be reliably determined, or if the user set airport is the same as the inferred airport, or if information from the inferred airport phase of flight test is false, the phase of flight algorithm can set the phase of flight as unknown. On the contrary, if all three of the above conditions are true, the phase of flight algorithm can determine if additional information from the inferred airport phase of flight test (e.g., IAT.14 and IAT.17) are true. If they are not true, the algorithm can set the phase of flight as unknown. If they are true, the algorithm can determine if the closest airport is not equal to the inferred airport. If the closest airport is equal to the inferred airport, the algorithm can obtain the closest pattern leg. If the closest airport is not equal to the inferred airport, the algorithm can obtain the pattern leg. In some embodiments, the pattern leg is obtained from the traffic pattern leg algorithm discussed below. Once the phase of flight algorithm has the closest pattern leg or the pattern leg, the algorithm can determine if the pattern leg is not unknown, if the pattern leg is not the departure leg, and if the pattern leg is not the crosswind leg. If the closest pattern leg or the pattern leg is not unknown and not the departure and not the crosswind leg, the phase of flight algorithm can then set the phase of flight to the closest pattern leg or the pattern leg. In some embodiments, the closest pattern leg or pattern leg here can be downwind, final, or base pattern leg.

If the pattern leg is unknown, departure, or the crosswind, the phase of flight algorithm can determine whether the phase of flight is arrival, maneuver, or en route. For example, as shown in FIG. 5, if the various Boolean values corresponding to the closest airport phase of flight or set airport phase of flight meet the conditions set in boxes 501, 502, and 503 (and other conditions hold true), the phase of flight can be arrival, en route, or maneuver. For example, if the user set airport equals the inferred airport, SAT.15 is true, and SAT.13 is false, then the phase of flight can be arrival. If the phase of flight algorithm cannot determine whether the phase of flight is arrival, en route, or maneuver, the phase of flight algorithm can set the phase of flight to unknown.

In some embodiments, after identifying a phase of flight, the phase of flight algorithm can send the phase of flight to a buffer 402 of the phase of flight algorithm to proceed with the sensibility stage. FIG. 4B shows the operations performed by the phase of flight algorithm to evaluate sensibility. Assessing the buffer (which can include determinations from previous iterations and can hold different phases) is what can output the single phase of flight. In some embodiments, the buffer can be implemented using a queue data structure. In some embodiments, the buffer can be implemented using a ring (circular) buffer.

Each time a new phase is calculated, the new phase can be added to the tracker and the older one can be removed, then the algorithm figures out if the transition makes sense. For example, an aircraft cannot go from en route to takeoff. Such a transition would likely indicate poor location data, and, in such a case, the phase of flight algorithm may set the phase of flight to unknown to ensure the phase of flight dependent algorithms do not issue false or misleading notifications.

The buffer can provide a way to provide a smooth answer for the phase of flight. The buffer can remove the first phase of flight from the tracker and append the newest calculated phase of flight to the tracker. In some embodiments, the buffer can store transitions between a predetermined number (e.g., 5) of the most recent identified phases of flights. The buffer can be used to then check for unique phases of flight in the tracker. If there are more than 2 unique phases of flight, the phase of flight for the overall phase of flight algorithm can be set to unknown. If there is only 1 unique phase of flight, the phase of flight for the overall phase of flight algorithm can be set to that phase of flight. If there are 2 unique phases of flight, the phase of flight algorithm can determine if the phase sequence is allowed for each phase in the tracker. If it is not allowed, the phase of flight for the overall phase of flight algorithm can be set to unknown. If the sequence is allowed, the algorithm can determine if the current phase of flight equals the maneuver phase. If it does, then the phase of flight for the overall algorithm can be set to maneuver. If the current phase of flight does not equal the maneuver phase, the phase of flight for the overall algorithm can be set to the first phase of flight in the tracker.

In some embodiments, the following transitions between a first and a second of the two unique phases of flight described above are allowed (phase A:phase B indicates a phase transition from phase A to phase B): MANEUVER: any phase other than UNKNOWN; any phase other than UNKNOWN:MANEUVER; TAXI:TAKEOFF; TAKEOFF: DEPARTURE; DEPARTURE:CROSSWIND; CROSS-WIND:DOWNWIND; DOWNWIND:BASE; BASE:FINAL; FINAL:LANDING; LANDING:TAXI; UNKNOWN: TAXI; FINAL:SHORTFINAL; LANDING: MISSED_APPROACH; and SHORTFINAL: MISSED_APPROACH.

Active Runway Algorithm

Figure 8:
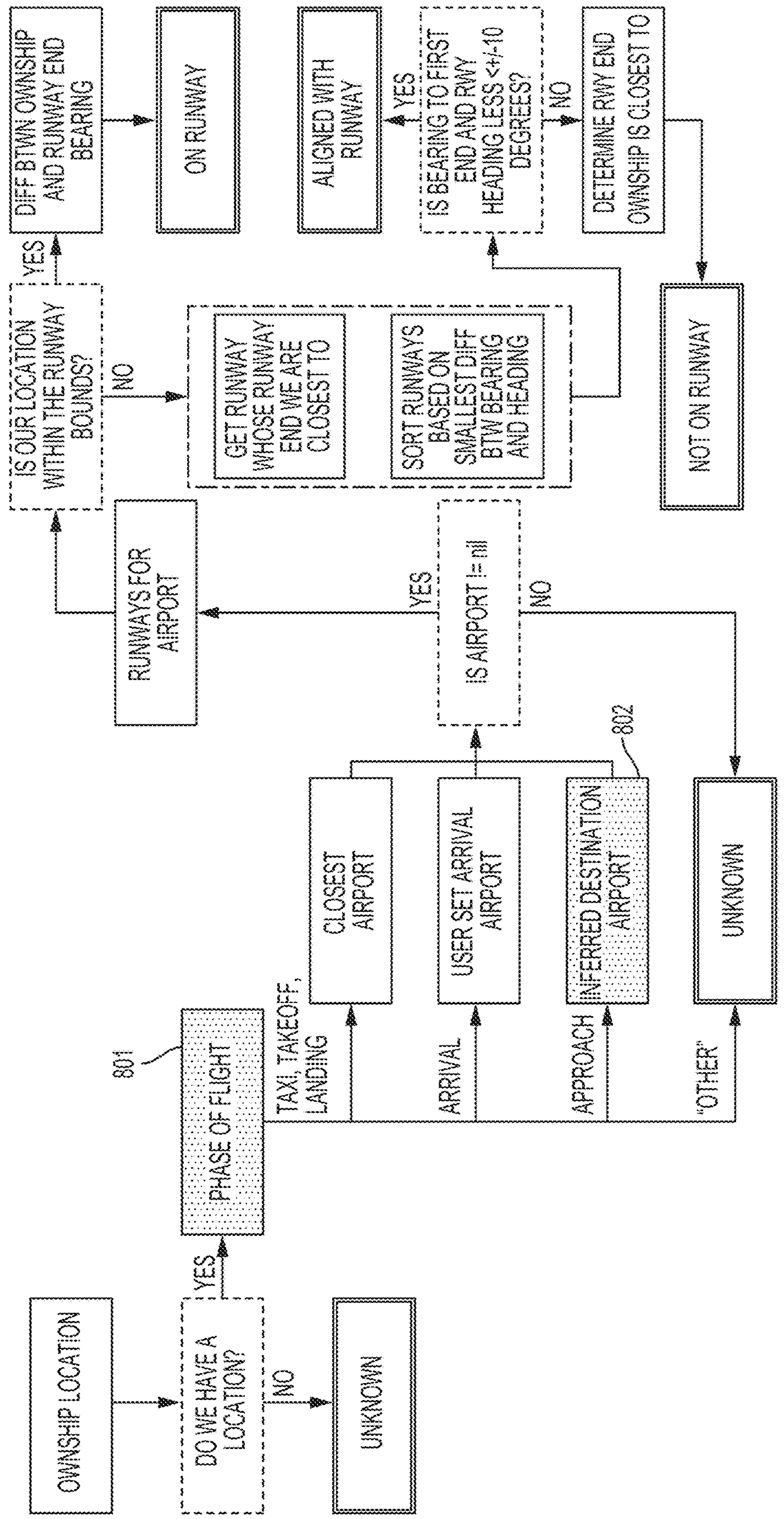
FIG. 8 illustrates an example of an active runway algorithm disclosed herein.

An active runway algorithm can determine where the aircraft currently is within a runway boundary and, if so, whether aligned with the runway. FIG. 8 illustrates an example of an active runway algorithm. The active runway algorithm can first receive ownship location information. If the location is not available, the active runway is unknown (e.g., nothing can be determined from the data given). If the location is available, the active runway algorithm can obtain the phase of flight from the phase of flight algorithm 801. If the phase of flight is taxi, takeoff, or landing, the active runway algorithm can obtain the closest airport. In some embodiments, the closest airport can be determined based on proximity to runway ends at an airfield. If the phase of flight is arrival, the active runway algorithm can obtain the user set arrival airport. If the phase of flight is approach, the active runway algorithm can obtain the inferred destination airport. In some embodiments, the inferred destination airport can come from the inferred destination airport algorithm 802. If the phase of flight is something other than taxi, takeoff, landing, arrival, or approach, the active runway may be unknown.

If the algorithm cannot obtain the airport (e.g., the user did not set one), the active runway may be unknown. Once the airport is obtained (either closest, set destination, or inferred), the active runway algorithm can obtain the runways for the given airport. The active runway algorithm can then determine whether the location of the aircraft is within the runway bounds. If yes, the active runway algorithm can determine the difference between the ownship and the runway end headings and say that the aircraft is aligned with the active runway. If no, the active runway algorithm can obtain the runway whose runway end the aircraft is closest to and can sort the various runways based on the smallest difference between runway bearing and ownship heading. The active runway algorithm can then determine if the bearing to first end and runway heading is less than a certain degree range (e.g., +/−10 degrees). If yes, then the aircraft is aligned with the active runway. If no, then the active runway algorithm can determine the runway end the aircraft is closest to and the aircraft is not aligned with the runway.

Runway Remaining Algorithm

Figure 9:
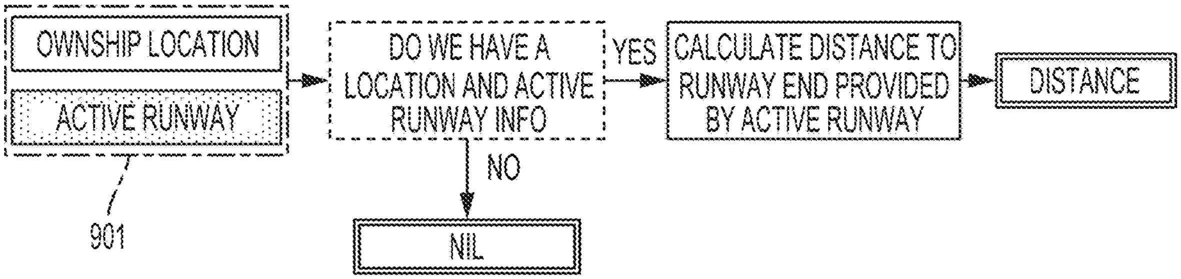
FIG. 9 illustrates an example of a runway remaining algorithm disclosed herein.

The runway remaining algorithm can determine the distance between the aircraft's current position and the end of the runway. In some embodiments, the runway remaining algorithm is only executed when the active runway algorithm has identified an active runway. FIG. 9 illustrates an example of a runway remaining algorithm. The runway remaining algorithm can obtain ownship location as well as the active runway. In some embodiments, the active runway is determined from the active runway algorithm 901. If there is no ownship location or no active runway information, then the runway remaining algorithm cannot provide a distance. If there is ownship location and active runway information, the runway remaining algorithm can calculate the distance between ownship and the runway end provided by the active runway.

Traffic Pattern Leg Algorithm

Figure 11:
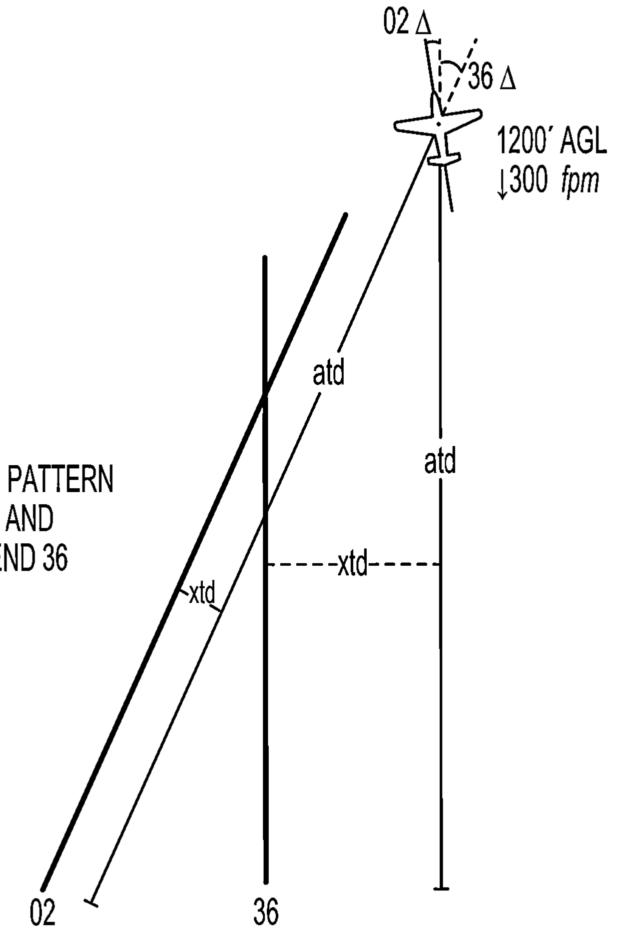
FIG. 11 illustrates a notional example of downwind leg scoring for two runway ends.

The traffic pattern leg algorithm can identify a traffic pattern leg in real time without the pilot providing the destination airport using a quasi-fuzzy algorithm. The algorithm can generate a fuzzy score for each possible traffic pattern leg at each runway at an airport. The fuzzy score can consider along track distance, cross track distance, altitude, and relative bearing. For example, FIG. 11 illustrates a notional example of downwind leg scoring for two runway ends. The highest score can determine both the traffic leg and the approach runway. In some embodiments, to stabilize the algorithm results, the results can be fed into a belief state algorithm that tracks consistency of the inferred runway over time. Once the belief state for a runway exceeds a threshold score, the fuzzy algorithm may only test that runway for traffic pattern leg. If confidence begins decreasing, the algorithm can return to testing all runways at the airport.

Figure 10A:
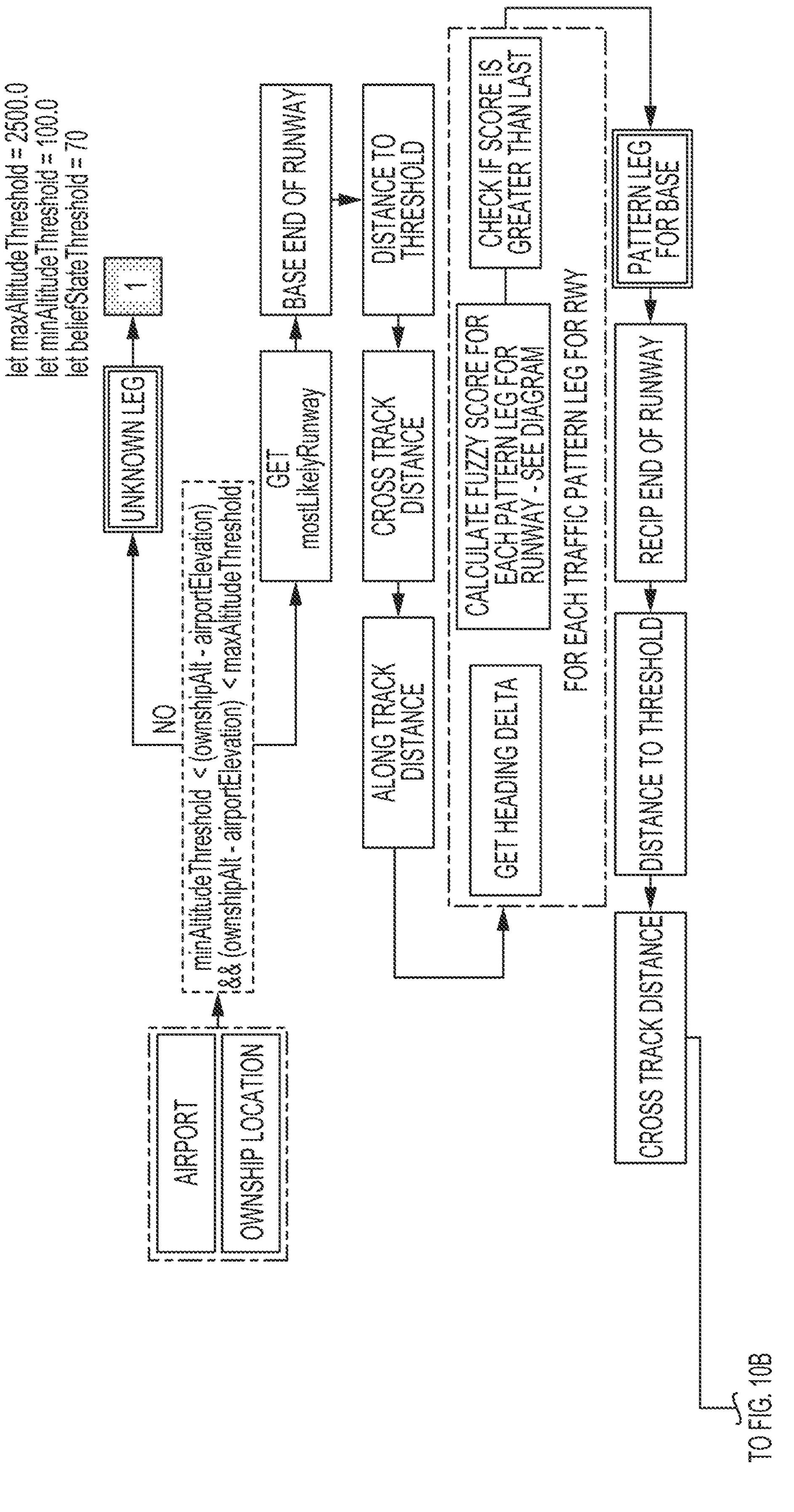
FIGS. 10A-B illustrate an example of a traffic pattern leg algorithm disclosed herein.
Figure 10B:
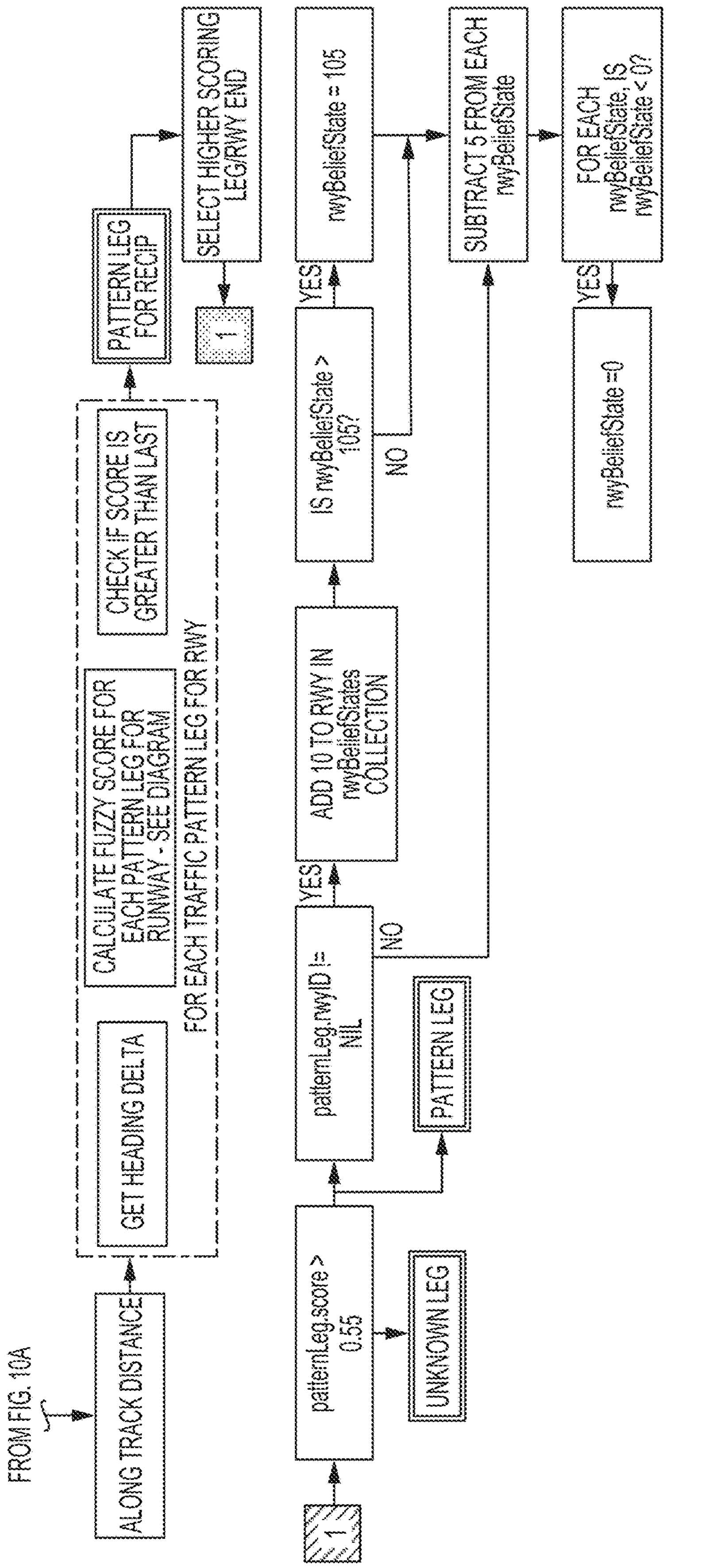

FIGS. 10A-B illustrate an example of a traffic pattern leg algorithm disclosed herein. In some embodiments, the traffic pattern leg algorithm has static thresholds defined. For example, these can be max altitude (e.g., 2500 ft), min altitude (e.g., 100 ft), and a belief threshold (e.g., 70) that can be used in the algorithm. The traffic pattern leg algorithm can obtain the ownship location (e.g., including an ownship altitude) and airport information (e.g., including airport elevation). The airport can be the closest airport, inferred airport, and/or set destination airport. The traffic pattern leg algorithm can then determine if the altitude AGL (i.e., ownship altitude minus the airport elevation) is between the min altitude threshold and the max altitude threshold. If no, the traffic pattern leg is unknown. If yes, the traffic pattern leg algorithm can obtain the most likely runway based on the belief state for each runway. For example, the most likely runway based on belief state can be determined by:

```
//Belief state, scored 0 to 100, represent how strongly we believe we are
on approach to the identified rwy, based on past history
func getBeliefStateRwy ( ) -> (rwyID: String, score: Int) {
    var highestScoringRunway = ""
    var highScore = 0
    for (rwyID, beliefState) in rwyBeliefStates {
```

-continued

```
        if beliefState > highScore {
            highScore = beliefState
            highestScoringRunway = rwyID
        }
    }
    return (rwyID: highestScoringRunway, score: highScore)
}
```

From there, the base end of the runway, the distance to threshold, the cross track distance, and the along track distance for the runway can be determined. From this information, the traffic pattern leg algorithm (for each traffic pattern leg for a given runway) can get heading delta, calculate a fuzzy score for each pattern leg for the runway (see FIG. 11), and check if the score is greater than the last. Accordingly, the traffic pattern leg algorithm can determine a pattern leg for the base end of runway based on the highest scoring pattern leg for the base end of the runway. The same calculation that was made for the base end of the runway can then be repeated except for the reciprocal end of the runway. Accordingly, the traffic pattern leg can also determine a pattern leg for the reciprocal end of the runway based on the highest scoring pattern leg for the reciprocal end of the runway. From the base pattern leg and the reciprocal pattern leg, the traffic pattern leg algorithm can select the higher of the two pattern leg scores.

If the pattern leg score for the higher of the two pattern legs is less than a threshold value (e.g., 0.56), the traffic pattern leg algorithm can set the traffic pattern leg to unknown. If the pattern leg score for the higher of the two pattern legs is greater than a threshold value (e.g., 0.55), the pattern leg associated with the pattern leg score for the higher of the two pattern legs can be the pattern leg for the overall traffic pattern leg algorithm.

Once the pattern leg is determined for the overall traffic pattern leg algorithm, the belief state can be updated as shown in FIGS. 10A-B. If the pattern leg runway ID is equal to nil, a determined value (e.g., 5) can be subtracted from each runway belief state in the collection of runway belief states. If the pattern leg runway ID is not equal to nil, a larger determined value (e.g., 10) can be added to the runway belief state. The traffic pattern algorithm can set the max belief score to 100 and minimum to 0. The runway belief state can determine that if the last X number of updates have identified the same runway as being the runway you're on approach to (i.e., the confidence of the runway is rising), the traffic pattern leg can start only testing on that runway. By doing this, the traffic pattern leg algorithm may not accidentally or momentarily identify the aircraft on a leg for a runway other than the one that the aircraft is actually approaching. If the runway belief state starts to decrease (i.e., go below the set threshold), the traffic pattern leg algorithm can start testing all the runways at the airport.

Inferred Destination Airport Algorithm

Figure 12A:
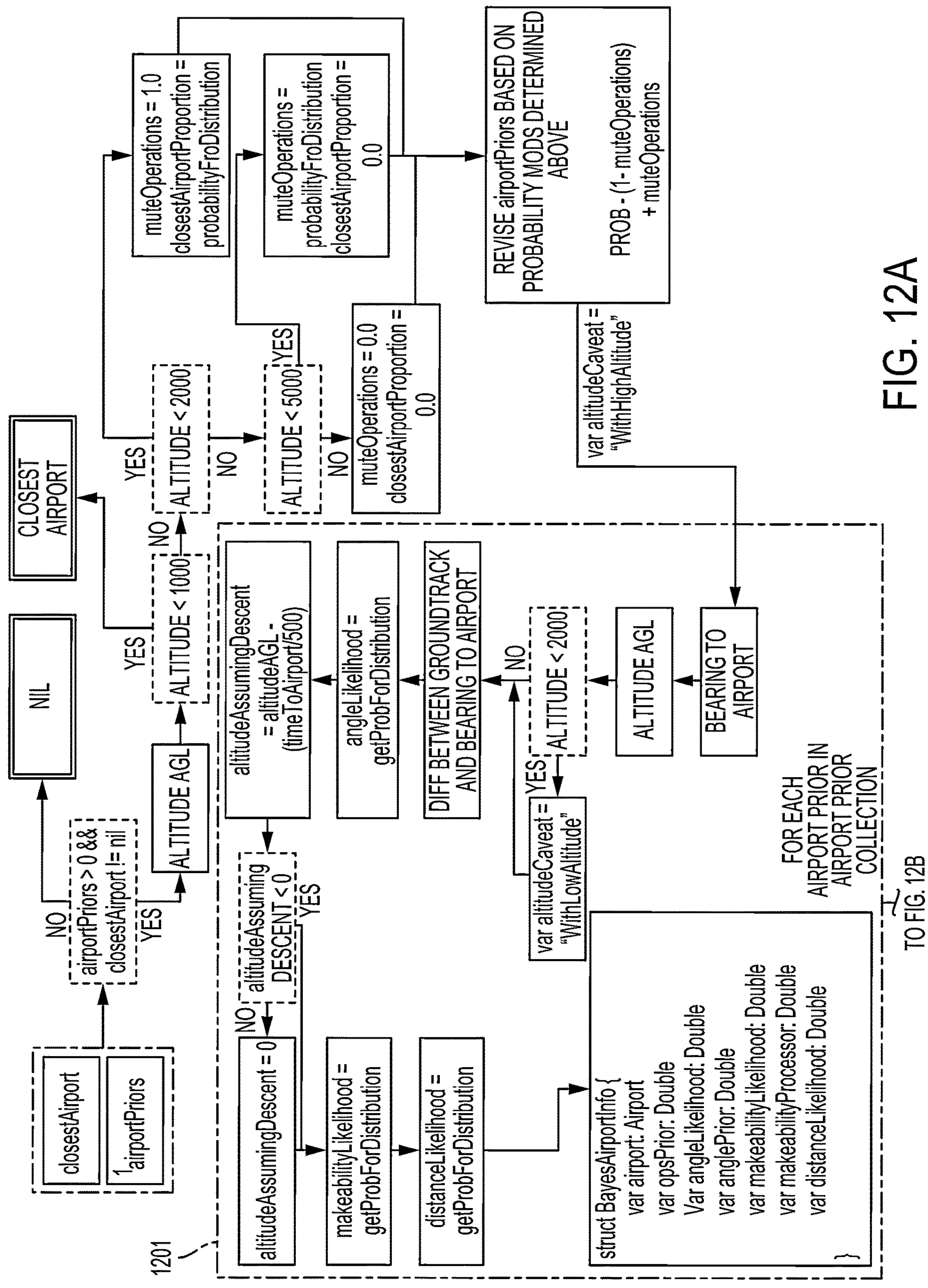
FIGS. 12A-B illustrate an example of an inferred destination airport algorithm disclosed herein.
Figure 12B:
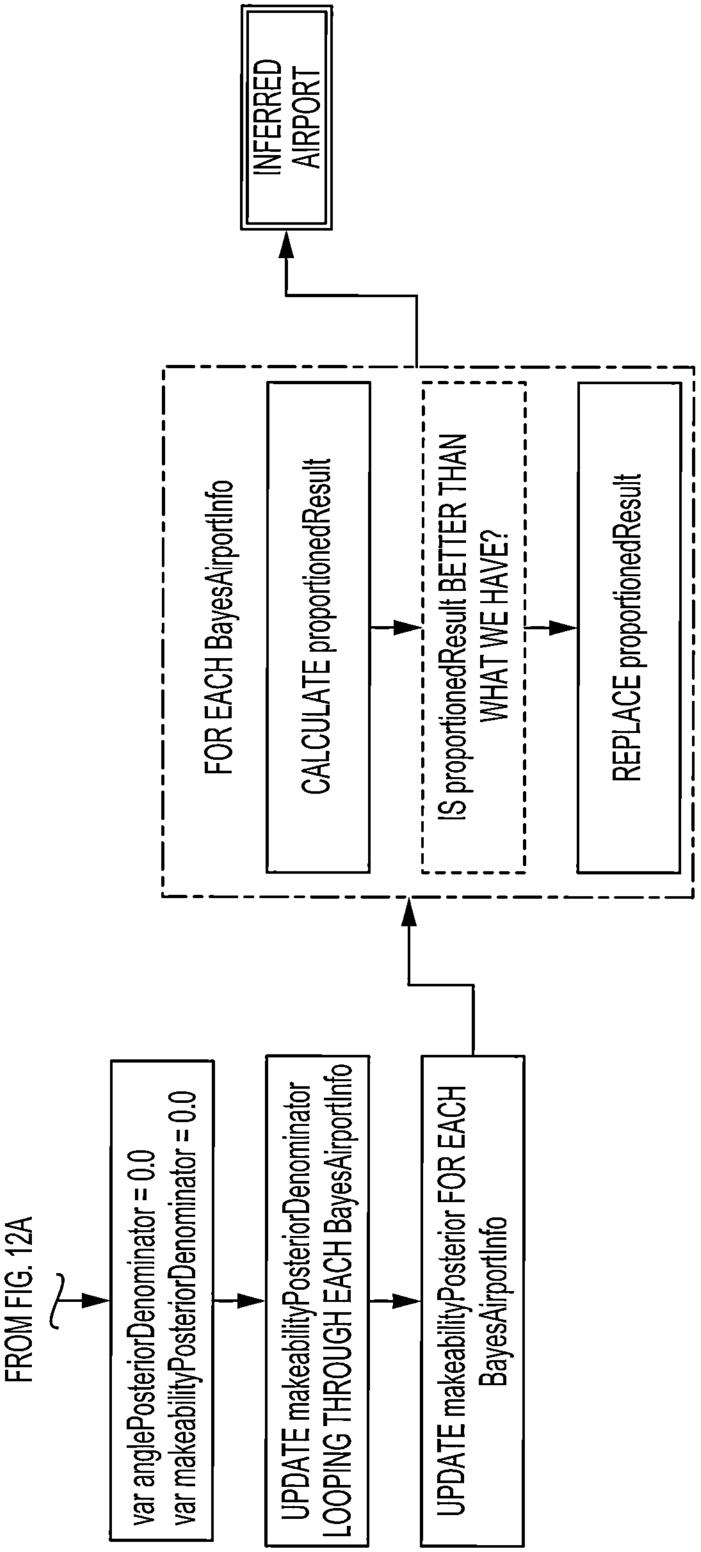

FIGS. 12A-B illustrate an example of an inferred destination airport algorithm. In some embodiments, the inferred destination algorithm infers a destination airport from a plurality of airports within a predefined distance (e.g., 50 nmi) from the aircraft's current position by calculating a probability for each airport in the plurality of airports. A calculated probability for an airport represents the likelihood that the pilot intends to land at that airport. In some embodiments, upon generating a plurality of probabilities corresponding to the plurality of airports, the inferred destination algorithm can select an airport from the plurality of airports having the highest probability as the inferred destination airport.

In some embodiments, to calculate the probability for the airport, the inferred destination airport algorithm considers one or more of the following factors: a proximity to the airport, whether the aircraft is heading towards the airport, whether a reasonable rate of descent would allow the pilot to reach the airport altitude (referred to as "makeability"), whether the pilot has a history of flights to the airport, and a use (measured in yearly operations at the airport). In some embodiments, which of the one or more above factors to consider are selected based on an aircraft altitude above the airport.

The inferred destination airport algorithm can use a variety of probability distributions. For example, the inferred destination airport algorithm can use:

```
func getProbabilityForDistribution (chi: Double, distribution: String) ->
Double {
    // Using a Gaussian function
    var χ = chi
    let μ: Double?
    let σ: Double?
    let e = 2.71828
    switch distribution {
    case "forAngleToAirportWithHighAltitude": //assumes χ from 0 to
180
        μ = 0
        σ = 10
    case "forAngleToAirportWithLowAltitude": //assumes χ from 0 to
180
        μ = 0
        σ = 90
    case "forDistanceToAirportWithLowAltitude":
        μ = 0
        σ = 5
    case "formakeability":
        μ = 0
        σ = 2500
    case "muteOperationsImpactByAltitude":
        μ = 2000
        σ = 1000
    case "enhanceClosestAirportImpactByAltitude":
        μ = 1000
        σ = 350
    if χ < μ{χ = μ! }
  default:
    μ = 0
    σ = 10
  }
  let raisedTo = −pow(χ − μ!, 2) / (2 * pow(σ!, 2))
  let likelihood = pow(e, raisedTo)
  return (likelihood)
}
```

The inferred destination airport algorithm can obtain the closest (e.g., based on a pre-determined range such as 10 miles) airport information and prior airport information. Every time a user flies, the origin and destination airport can be recorded to keep track of the number of times a pilot landed at a facility after departing from a facility. The prior airport information can be provided as an array of tuples (airportld, probability, airportObject). The inferred destination airport algorithm can determine if the number of prior airport records is greater than 0 and if the closest airport information is not nil. If the number of prior airport records is less than zero or if the closest airport information is equal to nil, then the inferred destination airport algorithm may not be able to provide an output. If both the number of prior airport records is greater than zero and the closest airport is not nil, the inferred destination airport algorithm can determine the altitude above ground level (AGL) using ownship location information. The altitude AGL can be determined by the ownship altitude minus the closest airport altitude. If the altitude AGL is less than a threshold altitude (e.g., 1000 feet), the inferred destination airport can be the closest airport. If the altitude AGL is greater than the first altitude threshold but less than a second threshold altitude (e.g., 2000 feet), then the inferred destination airport algorithm can ignore parameters like the use of an airport as measured by yearly airport operations (e.g., set muteoperations=1) and can set the closest airport proportion to the probability calculated using the Gaussian distribution (1=1000, 6=350). If the altitude AGL is greater than the second threshold altitude but less than a third threshold altitude (e.g., 5000 feet), then the inferred destination airport algorithm can set various parameters such as the muteoperations equal to the probability calculated using the Gaussian distribution (1=2000, 6=1000) and can set the closest airport proportion to zero. If the altitude AGL is greater than or equal to the third threshold altitude, then the muteoperations and the closest airport proportion can be set to zero. Essentially, the inferred destination airport algorithm can balance the aircraft's proximity to the airport versus the number of operations at that airport. Accordingly, one of the ways to infer destination airport over another can be based on how much activity an airport actually gets. This activity can be operations information about an airport (e.g., estimated operations per year).

After the muteoperations and the closest airport proportion are set, the inferred destination airport algorithm can revise the prior airport information based on the probability modifications described above. For example, a quick calculation can be made such as prob−(1−muteoperations)+muteoperations.

For each airport prior in the airport prior collection, the inferred destination airport algorithm can calculate the algorithm disclosed in box 1201. For example, the inferred destination algorithm can obtain the bearings to an airport, the altitude AGL, and if the altitude AGL is less than a threshold altitude (e.g, 2000 ft). If it is less than a threshold altitude, the inferred destination airport algorithm can set the altitude caveat to lowAltitude. If not, the altitude caveat can remain at highAltitude. The inferred destination airport algorithm can then obtain the difference between the ground track and the bearing to the airport and the angle likelihood can be set equal to the probability calculated using the Gaussian distribution ($\mu=0$, $\sigma=10$) if the altitude caveat is lowAltitude or the Gaussian distribution ($\mu=0$, $\sigma=90$) if the altitude caveat is highAltitude. The inferred destination airport algorithm can then determine whether a descent to the airport altitude is possible based on (1) the current time to the airport and (2) the altitude above the airport. For example, the altitude assuming descent can be set to the altitude AGL minus the time to airport divided by a given number (i.e., 500). The inferred destination airport algorithm can then check to see if the altitude, assuming descent is, less than 0. If not, the altitude assuming descent can be set to 0. If yes (or when the altitude assuming descent is set to the makeability likelihood can be set equal to the probability calculated using the Gaussian distribution ($\mu=0$, $\sigma=2500$). In addition, the distance likelihood can be set equal to the probability calculated using the Gaussian distribution ($\mu=0$, $\sigma=5$). Each of the outputs in box 1201 can convey Bayes airport information. Accordingly, the Bayes airport information can include elements of airport, the prior airports, the angle likelihood, the angle prior, the makeability likelihood, makeability posterior, and the distance likelihood.

After box 1201, the inferred destination airport algorithm can initialize some variables such as angle posterior denominator (e.g., set to a specific value) and makeability posterior denominator (e.g., set to a specific value) for each of the Bayes airport information elements that came out of box 1201. The inferred destination airport algorithm can then update the makeability posterior denominator by looping through each of the Bayes airport information elements that came out of box 1201. Such a calculation can be accomplished by:

```
makeabilityPosteriorDenominator+=(bayesInfo[index]·opsPrior*bayesInfo[index]·angleLiklihood/anglePosteriorDenominator)*bayesInfo[index]·makeabilityLikelihood
```

In addition, the inferred destination airport algorithm can update the makeability posterior for each of the Bayes airport information. Such a calculation can be accomplished by looping through each of the Bayes airport information elements that came out of box 1201:

```
bayesInfo[index]·makeabilityPosterior=bayesInfo[index]·anglePrior*bayesInfo[index]·makeabilityLikelihood/makeabilityPosteriorDenominator
```

The inferred destination airport algorithm can then (for each Bayes airport information) calculate the proportioned result. If the proportioned result is better than what was previously calculated by the inferred destination airport algorithm, then the proportioned result is replaced and the inferred airport can be determined.

In some embodiments, there can be three stages, with weighted averages used to transition between each. For example, in a first stage where the aircraft altitude is at above 5000 feet from the nearest airport surface, a Bayesian probability can be calculated based on prior activity and ops, relative bearing to the airport, and makeability (distances and altitude). Between 2000 feet and 5000 feet, the algorithm can start muting the impact of prior activity and ops such that, by the time the aircraft reaches 2000 feet, the Bayesian probability may not consider activity/ops at all. Between 2000 feet and 1000 feet, the algorithm can start weighting distance to the airport as a separate factor. Weight on distance can increase the lower the aircraft is. Below 1000 feet, the algorithm may only care about which airport is closest and set the inferred destination airport to the closest airport.

The set values for the conditions in all the algorithms and tests described above can be adjustable. For example, although FIGS. 6A-B checks if the calculated vertical speed (cvs) is greater than 250 fpm, this 250 fpm can be adjusted to another value such as 200 fpm. In addition, each of the algorithms or tests described above can be continuously updated or rerun, thereby providing continuous automatic outputs.

Digital Copilot Interactions

Figure 13:
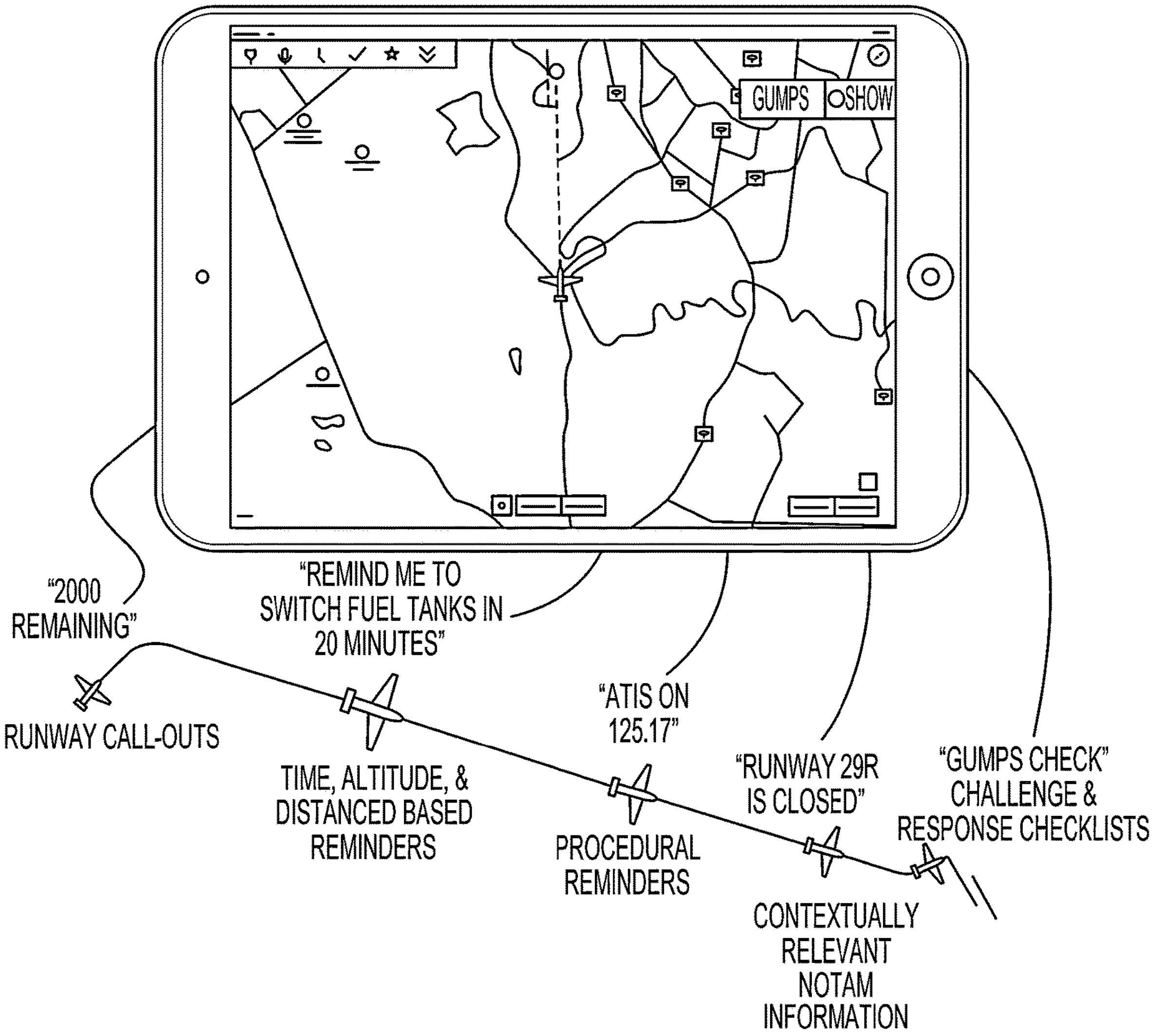
FIG. 13 illustrates an example user interface.
Figure 14:
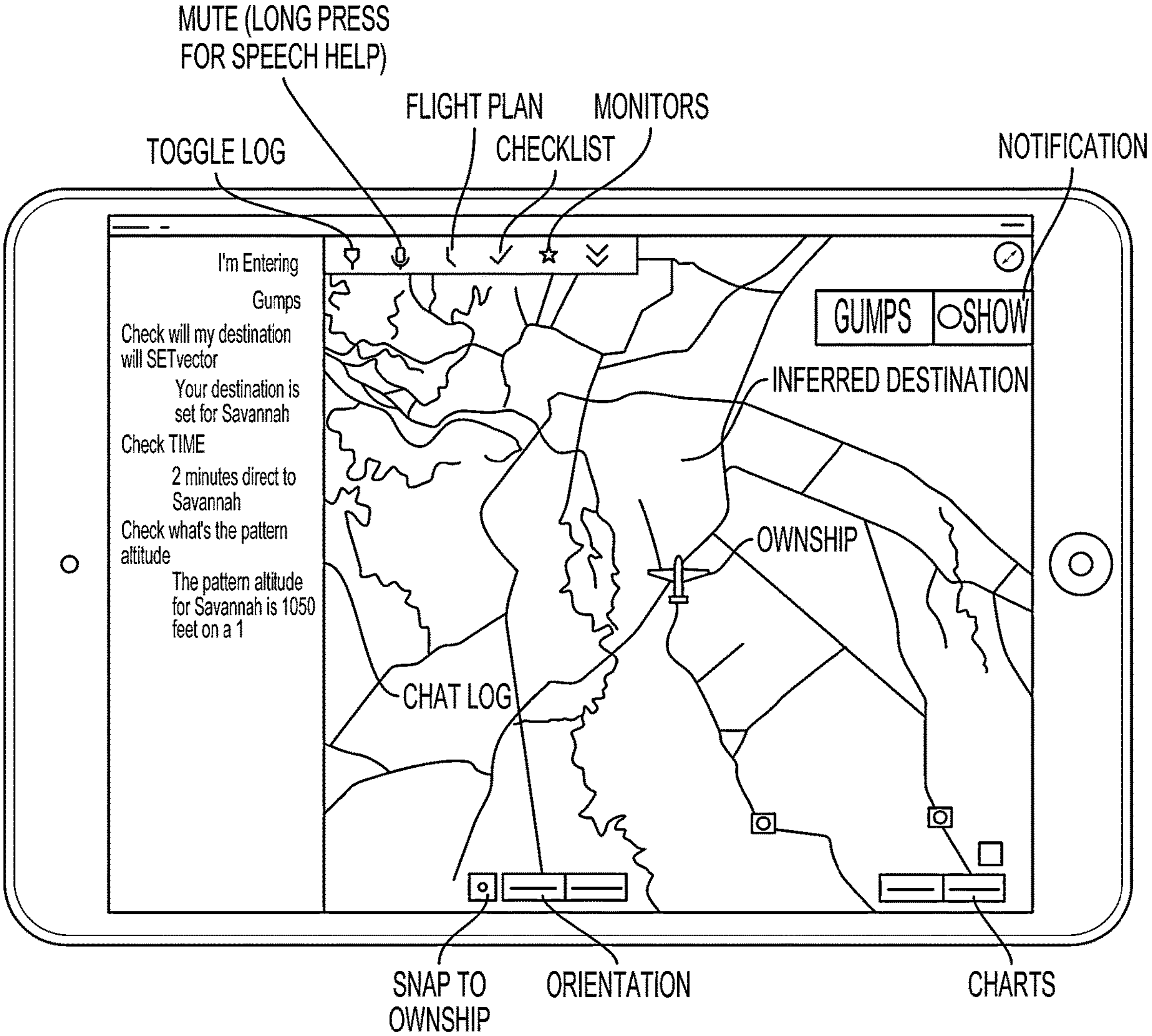
FIG. 14 illustrates a second example user interface.

In some embodiments, the digital copilot can be interacted with using a user interface. FIGS. 13-14 illustrate example user interfaces. As shown in FIG. 14, a user can interact with the user interface by touching the device and performing a gesture on various items on the user interface. For example, the user can toggle the log to see a chat log, mute the device, see the flight plan, see the checklist, view monitors, select the GUMPS notification, see the inferred destination, see a position of the aircraft operated by the user on a map (e.g., aircraft ownship information), snap to ownship, change orientation of the screen, see flight charts, etc. using the user interface.

In addition, in some embodiments, a user can interact with the digital copilot through speech recognition. For example, a user can verbally speak to the digital copilot to ask for frequencies and the digital copilot can use speech recognition to process the request and then provide the frequency information back to the user verbally through speech synthesis. In some embodiments, a user can request reminders as shown in FIG. 13 (e.g., remind me to switch fuel tanks in 10 minutes) or have the digital copilot report other notifications such as location based events. In some embodiments, the user can set one or more reminders to report a flight status (e.g., a current position) to air traffic control (ATC) during certain flight phases or during a specific leg of the approach phase.

Figure 15:
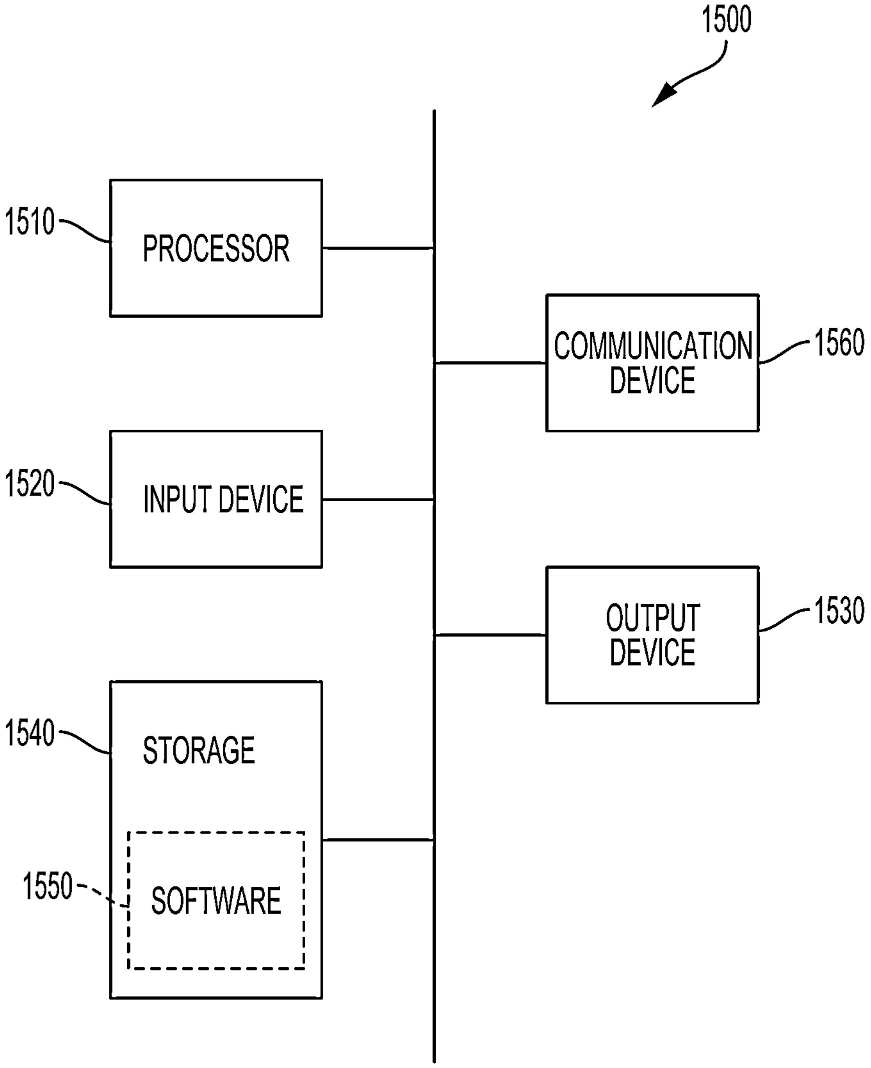
FIG. 15 illustrates an example of a computer in accordance with one embodiment.

FIG. 15 illustrates an example of a computer in accordance with one embodiment. Computer 1500 can be a component of a system for implementing the digital copilot according to the algorithms, methods, and systems described above, such as the controller of FIG. 2, or can include the entire system itself. In some embodiments, computer 1500 is configured to perform a method for determining phase of flight such as the phase of flight algorithm of FIG. 4. Computer 1500 can be a host computer connected to a network.

Computer 1500 can be a client computer or a server. As shown in FIG. 15, computer 1500 can be any suitable type of microprocessor-based device, such as a personal computer, workstation, server, or handheld computing device, such as a mobile phone or tablet. The computer can include, for example one or more of processor 1510, input device 1520, output device 1530, storage 1540, and communication device 1560. Input device 1520 and output device 1530 can generally correspond to those described above and can either be connectable or integrated with the computer.

Input device 1520 can be any suitable device that provides input, such as touch screen or monitor, keyboard, mouse, microphone, or speech recognition device. Output device 1530 can be any suitable device that provides output, such as a touch screen, monitor, printer, disk drive, or speaker.

Storage 1540 can be any suitable device that provides storage, such as an electrical, magnetic, or optical memory, including a RAM, cache, hard drive, CD-ROM drive, tape drive, or removable storage disk. Communication device 1560 can include any suitable device capable of transmitting and receiving signals over a network, such as a wired or wireless network interface chip or card, Wi-Fi or Bluetooth. The components of the computer can be connected in any suitable manner, such as via a physical bus or wirelessly. Storage 1540 can be a non-transitory computer readable storage medium comprising one or more programs, which, when executed by one or more processors, such as processor 1510, cause the one or more processors to perform methods described herein, such as the phase of flight algorithm of FIGS. 4A-B.

Software 1550, which can be stored in storage 1540 and executed by processor 1510, can include, for example, the programming that embodies the functionality of the present disclosure (e.g., as embodied in the systems, computers, servers, and/or devices as described above). In some embodiments, software 1550 can include a combination of servers such as application servers and database servers.

Software 1550 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1540, that can contain or store programming for use by or in connection with an instruction execution system, apparatus, or device.

Software 1550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computer 1500 may be connected to a network, which can be any suitable type of interconnected communication system. The network can implement any suitable communications protocol and can be secured by any suitable security protocol. The network can comprise networks links of any suitable arrangement that can implement the transmission and reception of network signals, such as wireless network connections, T1 or T3 lines, cable networks, DSL, or telephone lines.

Computer 1500 can implement any operating system suitable for operating on the network. Software 1550 can be written in any suitable programming language, such as C, C++, Java, Swift, Objective-C, or Python. In various embodiments, application software embodying the functionality of the present disclosure can be deployed in different configurations, such as in a client/server arrangement or through a Web browser as a Web-based application or Web service, for example.

This application discloses several numerical ranges in the text and figures. The numerical ranges disclosed inherently support any range or value within the disclosed numerical ranges even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A system, comprising:

an aircraft comprising a single-pilot cockpit;

a digital copilot controller;

one or more processors;

memory; and one or more programs, wherein the one or more programs are stored in the memory and configured to be executed by the one or more processors, the one or more programs including instructions for causing the digital copilot controller to:

determine a phase of flight for the aircraft;
determine whether the determined phase of flight is allowable given one or more previously identified phases of flight;
in response to determining that the phase of flight for the aircraft is takeoff, continuously notify the single-pilot cockpit of the aircraft of an amount of runway remaining based on the takeoff phase of flight;
in response to determining that the phase of flight for the aircraft is arrival, determine if an approach airport is the same as an intended airport destination; and
in response to determining that the phase of flight for the aircraft is landing, continuously notify the single-pilot cockpit of the aircraft of an amount of runway remaining based on the landing phase of flight.

2. The system of claim 1, wherein determining the phase of flight for the aircraft comprises determining the phase of flight based on the aircraft's current distance to a specified airport, the aircraft's altitude relative to the specified airport, the aircraft's ground speed, and/or the aircraft's ground speed.

3. The system of claim 2, wherein determining the phase of flight for the aircraft is takeoff comprises determining that the aircraft is increasing speed and determining that the altitude of the aircraft is low relative to airport elevation.

4. The system of claim 3, wherein determining the phase of flight for the aircraft is takeoff further comprises determining that the aircraft is on or over a runway and is aligned with the runway.

5. The system of claim 1, wherein the digital copilot controller is caused to, in response to determining the phase of flight for the aircraft is takeoff or landing, determine the closest airport.

6. The system of claim 5, wherein determining the closest airport is based on proximity to runway ends at an airfield.

7. The system of claim 1, wherein the digital copilot controller is caused to receive a destination airport for the aircraft.

8. The system of claim 7, wherein the digital copilot controller is caused to determine whether visibility at the destination airport is below a threshold visibility; and in response to determining that the visibility is below the threshold visibility, notify the single-pilot cockpit of the aircraft of the visibility at the destination airport.

9. The system of claim 7, wherein the digital copilot controller is caused to determine whether a ceiling at the destination airport is below a threshold ceiling; and in response to determining that the ceiling at the destination airport is below the threshold ceiling, notify the single-pilot cockpit of the aircraft of the ceiling at the destination airport.

10. The system of claim 7, wherein the digital copilot controller is caused to determine whether an aircraft distance to the destination airport is less than a threshold distance; and in response to determining that the aircraft distance to the destination airport is less than the threshold distance, notify the single-pilot cockpit of the aircraft of the distance to the destination airport.

11. The system of claim 1, wherein notifying the single-pilot cockpit of the aircraft of the amount of runway remaining based on the phase of flight comprises an aural, tactile, and/or visual notification.

12. The system of claim 1, wherein the digital copilot controller is caused to determine if the landing phase of flight is downwind, base, or short final.

13. The system of claim 12, wherein the digital copilot controller is caused to, in response to determining that the landing phase of flight is downwind, determine if the aircraft is drifting toward or away from the runway; and in response to determining that the aircraft is drifting toward or away from the runway, notify the single-pilot cockpit of the aircraft of the drifting toward or away from the runway.

14. The system of claim 12, wherein the digital copilot controller is caused to, in response to determining that the landing phase of flight is base, determine if a geographic path of the aircraft requires that the aircraft turn at an angle greater than a threshold angle; and in response to determining that the geographic path of the aircraft requires that the aircraft turn at an angle greater than the threshold angle, notify the single-pilot cockpit of the aircraft of the geographic path.

15. The system of claim 12, wherein the digital copilot controller is caused to, in response to determining that the landing phase of the flight is short final, determine if a Gas, Undercarriage, Mixture, Propeller, Seatbelts, and Switches (GUMPS) notification has been issued; and in response to determining that the GUMPS notification has not been issued, issue a GUMPS notification.

* * * * *